(12) United States Patent
Lambert et al.

(10) Patent No.: US 6,325,916 B1
(45) Date of Patent: Dec. 4, 2001

(54) WASTE WATER TREATMENT METHOD AND APPARATUS

(75) Inventors: Lawrence Lambert; Steve Kresnyak, both of Kelowna (CA)

(73) Assignee: Applied Oxidation Technologies (2000) Inc., Kelowna (CA)

( * ) Notice: Subject to any disclaimer, the term of this patent is extended or adjusted under 35 U.S.C. 154(b) by 0 days.

(21) Appl. No.: 09/572,831

(22) Filed: May 18, 2000

(30) Foreign Application Priority Data

May 21, 1999 (CA) .................................................. 2272596

(51) Int. Cl.$^7$ ...................................................... C02F 1/461
(52) U.S. Cl. .......................... 205/751; 205/752; 205/756; 205/757; 204/275.1; 204/278.5; 204/554; 204/660
(58) Field of Search ..................................... 205/756, 757, 205/751, 752; 204/275.1, 278.5, 660, 554

(56) References Cited

U.S. PATENT DOCUMENTS

| | | |
|---|---|---|
| 913,827 | 3/1909 | Korten . |
| 1,095,893 | 5/1914 | Landreth . |
| 1,131,067 | 3/1915 | Landreth . |
| 1,146,942 | 3/1915 | Landreth . |
| 3,523,891 | 8/1970 | Mehl . |
| 3,728,245 | 4/1973 | Preis et al. . |
| 3,846,300 | 11/1974 | Inoue . |
| 4,880,510 | 11/1989 | Uhrich .............................. 204/131 |
| 5,549,812 | 8/1996 | Witte ................................ 205/744 |
| 5,587,057 | 12/1996 | Metzler et al. ..................... 204/228 |
| 5,611,907 | 3/1997 | Herbst et al. ....................... 205/742 |
| 5,705,050 | 1/1998 | Sampson et al. .................... 205/687 |
| 5,746,904 | 5/1998 | Lee .................................. 205/757 |
| 5,756,824 | 5/1998 | Landscheidt et al. ............... 560/159 |
| 5,858,249 | 1/1999 | Higby ............................... 210/748 |
| 5,928,493 | 7/1999 | Morkovsky et al. ................ 205/757 |

FOREIGN PATENT DOCUMENTS

| | | |
|---|---|---|
| 2124616 | 12/1994 | (CA) . |
| 2145326 | 9/1995 | (CA) . |

*Primary Examiner*—Arun S. Phasge
(74) *Attorney, Agent, or Firm*—Paul S. Sharpe; Marks & Clerk

(57) ABSTRACT

A method for separating contaminants from a aqueous source containing contaminants. In one embodiment, the method involves the use of a high powdered oxidant dissolved within the aqueous system. The gas is dissolved within a reservoir in the aqueous solution and the pressure within the reservoir is controllable. This allows maximum contact of the oxidizing dissolved gas with the contaminant material. Once oxidized, the outlet of the reservoir is adapted to permit hydraulic cavitation. The net effect of the cavitation is to induce a foam formation which foam transports a floc into a separate phase from the aqueous solution. In this manner, the process is effectively a dissolved oxidizing gas mass transfer process. In another embodiment, the process may be augmented by electrocoagulation. This involves the use of an electric cell which is disposed within the reservoir containing the oxidant material. By providing electrodes and exposing the electrodes to a source of current, the contaminants within the aqueous solution are either oxidized or otherwise degraded and this complements the oxidation by the dissolved gaseous oxidant. An apparatus is also disclosed to effect the methods set forth above.

47 Claims, 15 Drawing Sheets

WASTE WATER TREATMENT METHOD AND APPARATUS

FIELD OF THE INVENTION

The present invention relates to waste water treatment method and apparatus and more particularly, the present invention relates to separating contaminants from an aqueous solution using mass transfer techniques and electrocoagulation.

BACKGROUND OF THE INVENTION

The problem of separating or removing contaminants from aqueous systems has been a complication that the art has lamented over for many decades. To this end, the art developed along with further industrial processes as water contamination grew commensurately with industrial progress. Initially, water treatment was simply a matter of adding materials suitable for inducing precipitation of certain materials, filtration, ion exchange and other processes. With the continual increase in strict requirements for clean water, electro chemistry was brought into favor. Broadly, the use of electrodes disposed within a cell and subjected to electric current was found to be useful for treating solutions containing contaminants. In some instances, other unit operations were combined with this treatment process in order to render inert compounds.

One of the references that was selected for review is U.S. Pat. No. 1,095,893, issued to Landreth, May 5, 1914. This patent relates to electrochemical treatment and in this patent, the patentee has identified that such cells are useful for the treatment of water. As stated in the disclosure electrodes of copper, aluminum, brass or other alloys are useful as cell plate material. In addition, the disclosure discusses the fact that settling tanks may be useful to assist in material settling (floccing). Column 2 of the disclosure indicates that the series of electrodes are arranged so that the water passes up through the apparatus and is forced to " . . . to take a circuitous course whereby any material added to it or found in it may be thoroughly mixed and all particles of the liquid be brought into contact with the electrodes . . . ". It is also as stated in the text at column 2, that the electrodes are in the form of horizontally disposed plates and that the plates may be provided with apertures which may be centrally arranged with the plates of alternating series of other plates have recesses at their ends. Column 3 of the disclosure states:

"To provide for the proper passage or circulation of the liquid between plates 14 and its movement throughout the apparatus, alternate plates are provided with apertures indicated at 14A, while the intermediate plates have their cut-away corners notched or recessed as at 14B as clearly illustrated in FIGS. 8 and 9. By this means, the liquid under treatment is diverted in its flow and caused to contact with the entire surface of the respective plates, insuring the desired electrical treatment."

Although this disclosure is useful for instructing the procedure for electrochemical treatment of water, there is no indication of the addition of an oxidant material such as ozone. Further, the teachings of this patent are limited to electrochemistry; the disclosure fails to set forth any details with respect to dissolved air flotation, fluid hydrodynamics, cavitation, flocculation or any other fluid dynamic principles that would augment the utility of the electrochemical cell taught in this patent.

In U.S. Pat. No. 1,146,942, issued to Landreth, Jul. 20, 1915, a variation on what has been discussed in the previous patent is set forth. In this reference, there is a clear indication that the electrodes are of a different polarity and that a suitable pole changing switch, an example is given as number 26 in the drawings, could be used to switch the current in order that one set of plates act as cathodes for a certain length of time while another set of plates act as anodes during this period of time. This reference advanced the art by providing a reverse polarity arrangement for changing the polarity of the individual cells within the unit. The reference, similar to its companion, is deficient on appreciation of countercurrent oxidation with a dissolved gas. Further, it is believed that this apparatus would not be particularly well suited to handling a wide variety of contaminant types (organic, inorganic, combinations thereof, etc.)

In a further reference issued to Landreth, namely U.S. Pat. No. 1,131,067, issued Mar. 9, 1915, there is a discussion of reintroducing treated liquid for further treatment by the apparatus as well as a discussion concerning oxidizing treatment or a treatment for the production of flocculent formed either from the metal electrodes or from simple chemical reaction or the latter stimulated by electric current; or any other treatment. At column 2, beginning at line 25 et seq., discusses recirculation of the material for further treatment in the apparatus.

Preis et al., in U.S. Pat. No. 3,728,245, issued Apr. 17, 1973, teach an apparatus for treating sewage incorporating a series of electrolytic plates for the purpose of electrocoagulation. The patentees discuss a need for maintaining pressure in the circuit so that chlorine and ozone are maintained in solution in order to enhance bactericidal action. This reference advanced the art developed by Landreth et al., by employing an oxidant to enhance the electrocoagulation. The reference, although providing further instruction in this art, is deficient any discussion cavitation or floc generation by pressure discontinuities in an outlet stream of treated aqueous material.

Other generally relevant references include U.S. Pat. No. 913,827, issued to Korten, Mar. 2, 1909, U.S. Pat. No. 3,523,891, issued to Mehl, Aug. 11, 1970, U.S. Pat. Nos. 5,928,493; 5,705,050; 5,746,904 and 5,549,812, 3,846,300, 5,587,057 and 5,611,907.

The electrolytic processes were found to be generally useful, however, the cellular design was such that the electrodes often would accrue debris and, therefore, would change the requirements of the current of the cell. In addition, many of the plates in the existing arrangements were fairly large and did not provide any improvement to enhance the surface area to therefore increase the number of reactions with the contaminants to be treated in the water. This, of course, leads to lower degree of interactions and a higher cost of running the cell in terms of the current requirements due to debris buildup.

It has also been proposed to employ dissolved air flotation systems. One such arrangement is made by the Precision Environmental Systems Company. This company manufactures devices which are useful for flocculation and coagulation within the same unit. This unit is quite useful for the purpose for which it was designed, however, the arrangement has an extremely large footprint and does not provide for different chemical processes to occur within the same unit.

Of the more desirable arrangements that have evolved in this art for water treatment are perhaps the use of dissolved gases for the purpose of oxidation has been moderately successful. In the art that is currently known, typically oxidation cells are open to atmospheric pressure where a gas dissolved in solution is allowed to evolve out of the solution. The arrangement in the art provide a tortuous path or other applied force in order to keep the bubbles in solution as long as possible. This has the advantage of providing a reaction site (the surface of the bubble) of the oxidant material so that the contaminant can be oxidized. Once the gaseous material then evolves to the surface, the contaminant is flocculated and the materials then separated. This is broadly known as aeration and various devices have been proposed in this art in order to maintain the bubbles in solution and thus enhancing the degree of interaction of the bubble surface with the material to be oxidized or otherwise decontaminated.

It would be desirable if there were a process whereby a gaseous oxidant could be introduced into a reservoir or other chamber or confined area under sufficient pressure to maintain the gas in solution. This affords the opportunity for the smallest possible bubbles in solution to oxidize contaminants present in the solution. It would be particularly desirable if there were a system available where the dissolved oxidant gas could be maintained in solution in order to provide the smallest possible bubbles and therefore the greatest possible degree of surface area for reaction with the contaminants to be separated and further, affording control of the bubble size.

The present invention is directed to providing a mass transfer mechanism and advanced oxidation technologies for the separation of contaminants from an aqueous solution where the oxidant is maintained in solution until such time as it is desirable to allow the pressure to be reduced and the oxidant to come out of solution.

SUMMARY OF THE INVENTION

One object of one embodiment of the present invention is to provide an improved method of separating contaminants from aqueous solution. A countercurrent mass transfer mechanism is employed.

A further object of one embodiment of the present invention is to provide a continuous method of separating contaminants from an aqueous solution comprising the steps of:
  providing an aqueous solution containing contaminants;
  providing a closed reservoir having an inlet and an outlet, the inlet at a higher elevation than the outlet;
  introducing the aqueous solution into the reservoir;
  entraining an oxidant into the aqueous solution;
  maintaining super atmospheric pressure in the reservoir to minimize bubble size of the oxidant to thereby maximize available surface area of bubbles of oxidant with the contaminants in the aqueous solution;
  oxidizing the contaminants; and
  selectively inducing a pressure discontinuity extraneous of the reservoir to flocculate oxidized contaminants into a separate phase from the aqueous solution.

With respect to the oxidant, ozone is one of the preferred oxidants for use in the present invention, however, it will be readily appreciated that any other suitable oxidant could be used such as chlorine, bromine, hydrogen peroxide, suitable nitro compounds, inter alia.

It has been found that by effectively providing an inverted or reversed aeration system that effective oxidation of the contaminant can be achieved. The reservoir may be an isolated chamber, tube with closed ends or, alternatively, may comprise an earth formation for subterranean treatment of contaminants in an aqueous solution. In the instant methodology, the inlet is disposed at a higher elevation than the outlet. In this manner, the incoming entrained gaseous oxidant is forced downwardly through the solution and, therefore, will act in a countercurrent manner with the aqueous solution to be treated. By maintaining a super atmospheric pressure in the chamber reservoir container, etc., the gaseous oxidant is maintained in solution and in very fine bubbles. This has produced marked results, since the smaller bubbles provide a significantly improved surface area for contact with the contaminants to oxidize the latter. This is achieved by control of the pressure into the reservoir and the pressure at the outlet thereof. In this manner, the pressure is effectively adjustable and can be customized by the user. This is in marked contrast to the prior art which effectively provide open vessels and, therefore, allowed the pressure to equalize at atmospheric pressure and simply provided convoluted or otherwise tortuous paths through which a gas was forced. The concept in the prior art was to provide the tortuous path in order to try and keep the bubbles in solution and, therefore, at least partially in contact with the material to be treated. The technique of the prior art is effectively an aeration technique where a gas is forced through a solution for oxidation purposes.

The difference in the instant application is quite pronounced and results in a significant advance in this art. It has been found that by maintaining the pressure within a confined chamber, the gaseous oxidant can be maintained in solution for a user selected duration; this is in contrast to what the prior art proposes. The instant case permits control of the bubble size of the oxidant within the chamber and facilitates countercurrent contact with the oxidant bubbles and aqueous solution and further allows for user selected pressure discontinuity in the form of, for example, hydraulic cavitation, to induce floc formation. Control on this level has not been previously proposed in the prior art whatsoever; the prior art effectively used a "hit and miss" process of aeration as opposed to a controlled process, which also results in the formation of a rich floc and clean aqueous solution.

As a generic overview of the present invention, the same unifies a series of technologies including dissolved air flotation, hydraulic cavitation, fluid dynamics, mass transfer and electrocoagulation. These concepts are linked together to provide an effective contaminant separation process, which is indiscriminatory as to the contaminant. This is a feature that was not possible in the prior art; the existing art, in most cases, proposes methods which are sensitive to the materials present in the system to be treated. Conveniently, by providing pressure control to the material inlet of the reservoir relative to the outlet, the maximum amount of gaseous oxidant can be retained in solution, thereby providing the smallest possible bubbles in the highest possible density with the greatest possible duration in solution. These features together with the principles of electrocoagulation contribute to the success of the protocol set forth herein.

In order to augment the mass transfer process set forth hereinabove, it has been found that the combination of that technology together with electrocoagulation produces super results and significantly reduces the limitations and problems associated with the art. In effect, as a further object of one embodiment of the present invention, the control provided with the gaseous oxidant system could be unified with the benefits of electrocoagulation. Accordingly, as a further object of one embodiment of the present invention, there is provided a continuous method of separating contaminants from an aqueous solution comprising the steps of:
  providing an aqueous solution containing contaminants;
  providing a closed reservoir having an inlet and an outlet, the inlet at a higher elevation than the outlet;
  positioning an electrocell with the reservoir for applying an electric field to the aqueous solution;

introducing the aqueous solution into the reservoir;

entraining an oxidant into the aqueous solution;

maintaining super atmospheric pressure in the reservoir to minimize bubble size of the oxidant to thereby maximize available surface area of bubbles of oxidant with the contaminants in the aqueous solution;

oxidizing the contaminants and the oxidant and flocculating the contaminants by exposure to the electric field; and selectively inducing a pressure discontinuity extraneous of the reservoir to flocculate any remaining oxidized contaminants into a separate phase from the aqueous solution.

A further object of one embodiment is to provide a method of separating contaminants from an aqueous solution, comprising the steps of:

a. providing an aqueous solution containing contaminants;

b. oxidizing the aqueous solution with an oxidant under adjustable super atmospheric pressure to maintain the oxidant in solution;

c. exposing the aqueous solution to an electrocell for electrocoagulating contaminants; and d. selectively inducing a pressure discontinuity to flocculate coagulated and oxidized contaminants into a separate phase from the aqueous solution.

Of particular value is the fact that the aqueous solution may contain both organic, inorganic waste material or a combination of both.

A still further object of the present invention is to provide an apparatus for separating contaminants from an aqueous solution, comprising:

an aqueous source containing contaminants;

a closed pressurizable reservoir having an inlet and an outlet, the inlet being disposed at a higher elevation than the outlet, the inlet in communication with the aqueous source;

means for introducing an oxidant under pressure into the reservoir;

an electrocell disposed within the reservoir for electrocoagulating material in the aqueous source;

means for supplying current to the electrocell; and means for selectively inducing hydrodynamic cavitation in treated aqueous solution to flocculate oxidized contaminants into a separate phase from the aqueous solution.

Having thus described the invention, reference will now be made to the accompanying drawings illustrating preferred embodiments.

BRIEF DESCRIPTION OF THE DRAWINGS

Similar numerals in the figures denote similar elements.

PREFACE

BOD when used herein refers to biological oxygen demand; COD when used herein refers to chemical oxygen demand; and, TOD when used herein refers to total oxygen demand. Quantities when indicated by percentage (%) will be understood to reference percentage (%) by weight unless otherwise indicated. The symbol w/v will mean weight in volume. The symbol $O_3$ will mean ozone gas. All other chemical symbols referenced herein will have there usual meaning. TSS when used herein refers to total suspended solids. TDS when used herein refers to total dissolved solids.

DETAILED DESCRIPTION OF THE PREFERRED EMBODIMENTS

Figure 1:
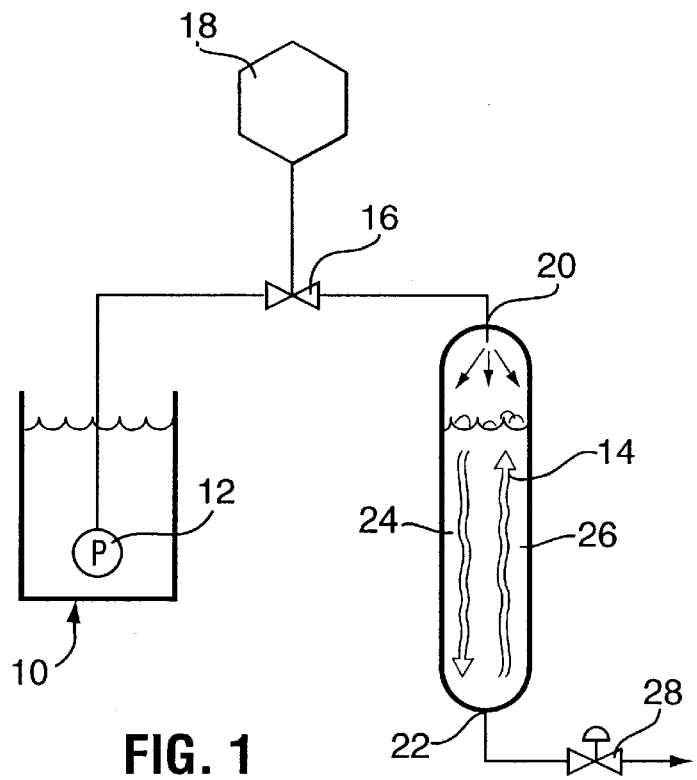
FIG. 1 is a schematic illustration of one embodiment of the present invention.

Referring now to the drawings, FIG. 1 illustrates an overall schematic representation of the apparatus for use in practicing the methodology. In the example, a source of water contaminated with organic contaminants, inorganic contaminants or a combination thereof, is represented by numeral 10. A pump 12 may be provided to pump the fluid from the source 10 thereof into a reservoir 14. Intermediate the source 10 and reservoir 14 is disposed a venturi 16, which venturi 16 is in fluid communication with a source of an oxidizing agent, the source being denoted by numeral 18. The oxidizing agent, when in the state of a gas, may comprise ozone, bromine, chlorine, nitro compounds. If the oxidizing agent is selected to be a liquid, hydrogen peroxide and other related oxidants will be useful. In the instance where the oxidant selected is not in a gaseous state, this oxidant can be converted from, for example, a liquid state to a gaseous state by any suitable means known to those skilled in the art. Oxidant from source 18 is introduced into reservoir 14 by making use of the venturi 16.

Reservoir 14, in the example shown, comprises a pressurizable container, constructed of material capable of withstanding at least several atmospheres of pressure. The reservoir 14 includes an inlet 20 in fluid communication with venturi 16 and an outlet 22. Inlet 20 is positioned at a higher elevation than outlet 22. The venturi 16 introduces the oxidant into the aqueous source by entrainment. When the entrained oxidant and aqueous solution enter reservoir 14, the contents are pressurized.

It is important with the technology set forth herein that the pressure is maintained within reservoir 14. This facilitates the dissolution of ozone gas into the solution and promotes the formation of minute bubbles (not shown). The flow is downward from the inlet 20 to the outlet 22. In this manner, the oxidant bubbles rise countercurrent to the aqueous solution. This flow pattern is very effective when the solution is dense with small bubbles. The small bubbles, as will be appreciated by those skilled, provide an enormous amount of surface area relative to larger bubbles. In addition, if the pressure is maintained, the smaller bubbles have a longer life span in solution and thus provide the maximum amount of oxidizing power. The countercurrent flow mechanism is indicated broadly by arrows 24 and 26 within reservoir 14.

After a sufficient residence time in reservoir 14, oxidized material exiting at outlet 22 is then subjected to a pressure discontinuity in order to induce hydrodynamic cavitation. By this mechanism, if the pressure is released, the gaseous oxidant evolves out of solution and the flocculated material is effectively floated so that the flocculated phase is distinct from the aqueous phase. The pressure discontinuity may be effected by a flow constrictor, variable orifice plate or other pressure relief mechanism, broadly denoted by numeral 28. Once distinct phases have been created and thus the contaminants separated from the aqueous solution, the individual phases may be subjected to further unit operations. In the case of the aqueous phase, the water may undergo additional purification by way of specialized distillation techniques, ion exchange, inter alia. With respect to the floc, this may be processed by specific techniques to recover any values that may be matrixed within the floc. The subsequent unit operations referenced above are not shown in the drawings.

Figure 2:
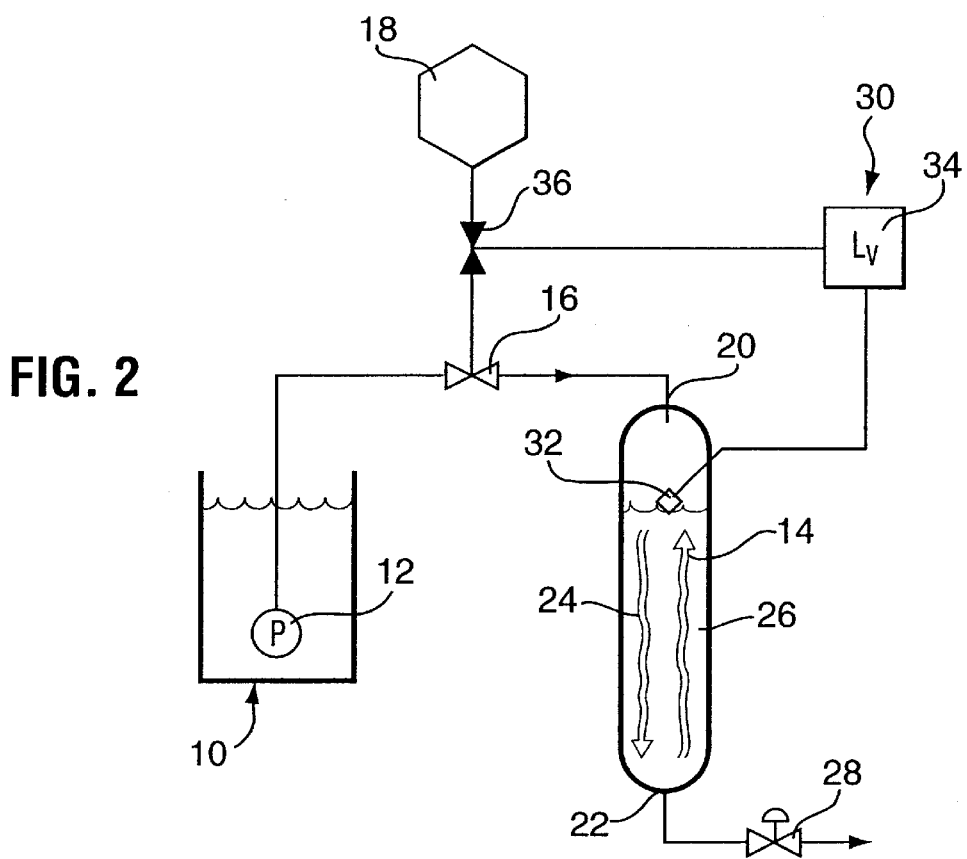
FIG. 2 is a schematic illustration of a second embodiment of the present invention.

Turning to FIG. 2, shown is a variation of the apparatus in FIG. 1. In this embodiment, a sensor apparatus, broadly denoted by numeral 30, is provided to ensure supersaturation of aqueous solution prior to exiting outlet 22 and control the quantity of oxidant induced by venturi 16. This is achieved by providing a float valve 32, which floats at the level of the liquid within reservoir 14 and is in electrical communication with a sensor 34. Sensor 34 is, in turn, in electrical or mechanical communication with a valve 36. Valve 36 is directly linked to the supply of oxidant 18 and, therefore, when the liquid level in reservoir 14 is detected by float 32 to be substantially decreasing, sensor 34 signals valve 36 to suspend introduction of oxidant into the system and particularly into inlet 20 via through venturi 16. This arrangement could alternatively be replaced with a simple vent tube (not shown).

Figure 3:
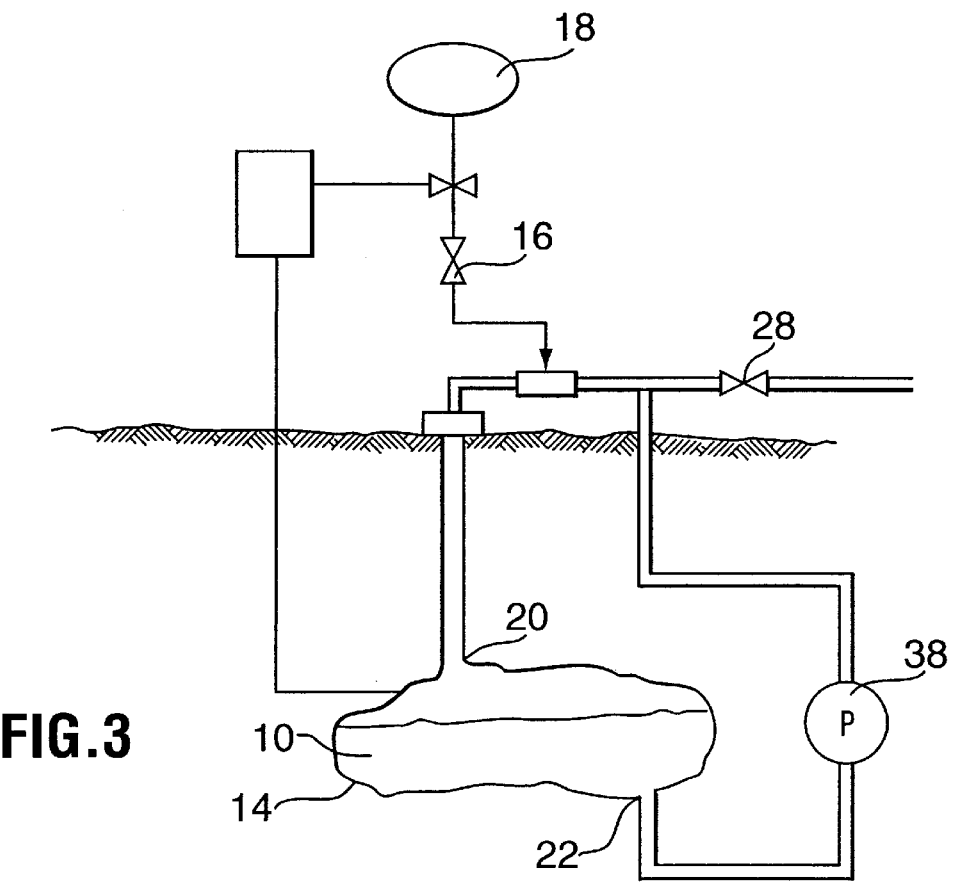
FIG. 3 is a schematic illustration of a third embodiment of the present invention.

Referring now to FIG. 3, shown is an alternate embodiment of that which has been discussed in FIGS. 1 and 2. In this embodiment, the reservoir 14 is represented as a subterranean formation within which is disposed a source of contamination and an aqueous phase 10. This embodiment establishes the fact that this technology can be immediately applied to field applications. This would be of use where a deposit of hydrocarbons, or other petroleum/organic compounds were present in an earth formation. In the instance where the earth formation is composed of a material insufficient to sustain periods of superatmospheric pressure, the formation could be pre-treated with a material to render impermeable the internal surface, harden the surface, or otherwise prepare the same for sustained pressure treatment. Suitable techniques, compounds or other treatments will be appreciated by those skilled in the art.

In this process, oxidant could be introduced in much the same way as that which has been discussed. The oxidant would be introduced into the formation 14 through an inlet 20 in the formation. As established above, the formation 14 contains an aqueous mixture of organics, inorganics, etc., and therefore, pressurized introduction of the oxidant into the formation would result in the oxidation of the contaminants in the same mechanism (countercurrent) as discussed regarding FIGS. 1 and 2. The oxidized material could be transported from an outlet 22 in formation 14 via pump 38 to flow constrictor 28 for pressure discontinuity and thus floccing of the oxidized compounds. Once flocced, the contaminants are effectively separated from the aqueous phase and may undergo subsequent unit operations as mentioned herein previously.

In order to augment the effectiveness of the system discussed in FIGS. 1 through 3, the aqueous solution may be subjected to an electrocoagulation unit operation. Various embodiments will now be specified.

Figure 4:
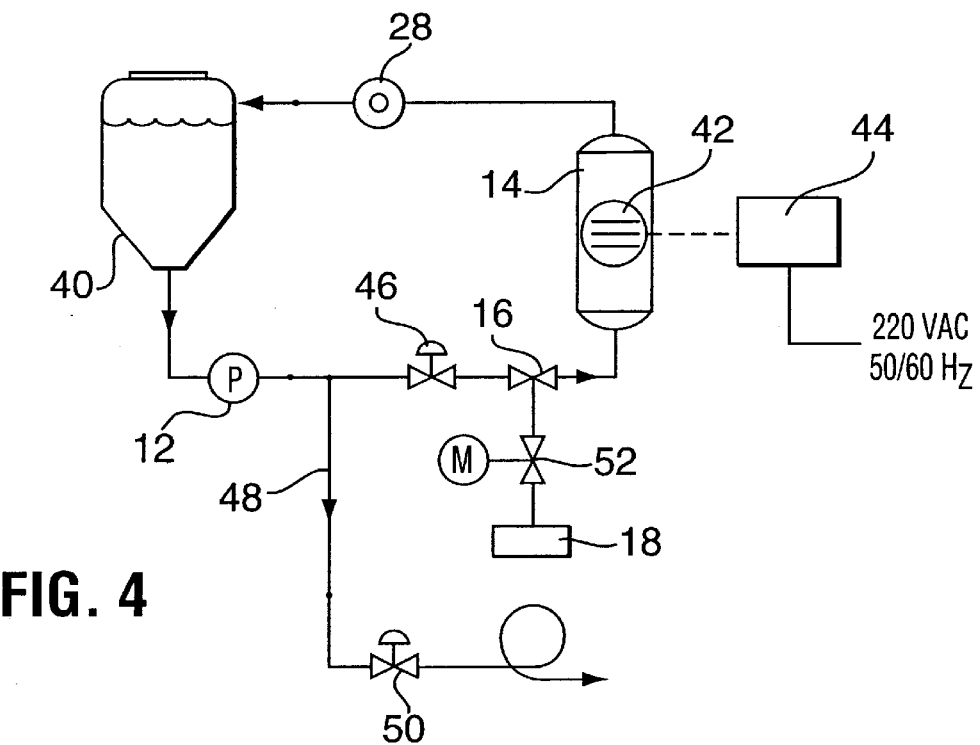
FIG. 4 is a schematic illustration of a fourth embodiment of the present invention.

Referring to FIG. 4, shown is a further variation of the apparatus. In this embodiment, waste water from a tank 40 is pumped by a pump 12 through a venturi device 16 downstream of the pump 12. Ozone produced by an ozone source 18 is entrained in the waste water via venturi 16. The waste water then passes through an electro-flocculation cell 42, disposed in reservoir 14. The reservoir 14 and cell 42 will collectively be referred to as the cell 42 hereinafter. The waste water is forced to pass in a turbulent manner through an intense electric field produced by cell excitation electronic circuitry 44. The waste water then passes from the reservoir 14 through a flow constrictor, an example of which is an orifice plate 28 and thence back into the tank 40.

In the waste water flow line between the pump 12 and the venturi 16 there is provided a cell shut-off valve 46. Between the pump 12 and the cell shut-off valve 46, there is connected a tank discharge line 48 having a discharge shut-off valve 50. The cell shut-off valve 46 is open during the treatment of the waste water and closed when the operator wishes to discharge the waste water from tank 40 following treatment. Conversely, the discharge shut-off valve 50 may be closed during treatment of waste water and open for discharge of the treated waste water.

A gas valve 52 is provided to regulate the flow of ozone into the waste water. The gas valve 52 may optionally be electrically controlled in some embodiments of the inventive apparatus as described in more detail below.

The orifice plate 28 may comprise a disk of stainless steel or other material resistant to dissolution by the waste water interposed in the piping connecting the cell 42 and the tank 40 and having at least one sharp-edged opening (not shown). In the exemplary apparatus described in detail below, a single opening in the orifice plate 28 is used that is approximately 10% larger than the passage through the venturi 16 so that during operation of the apparatus, the pressure of the waste water in the cell 42 is acceptably lower than the pump outlet pressure, so as to ensure proper operation of the venturi 16, within the designed operational parameters of the latter.

It will be appreciated that higher pressures in the cell 42 may be advantageous for some waste water compositions, but if a higher pressure is indicated, then a pump 12 will have to be selected to provide a higher pressure to the venturi 16 in order to provide a pressure drop across venturi 16 to entrain the amount of ozone in the waste water that is desirable for the particular composition of the waste water being treated. Simply reducing the area of the opening or openings in the orifice plate 28 to increase the pressure in cell 42 is not desirable as then not enough ozone will be entrained in the flow through the venturi 16 as the pressure drop across the venturi will be reduced. It is also not desirable for the area of the opening or openings in the orifice plate 28 to be too large, even if the desired pressure in the cell 42 is maintained, as that would result in too large a pressure drop across the venturi 16 and the entraining of too much ozone in the waste water, leading to a build up of gas in the cell 42 and a waste of ozone as well as less effective operation of the cell 42.

Figure 5:
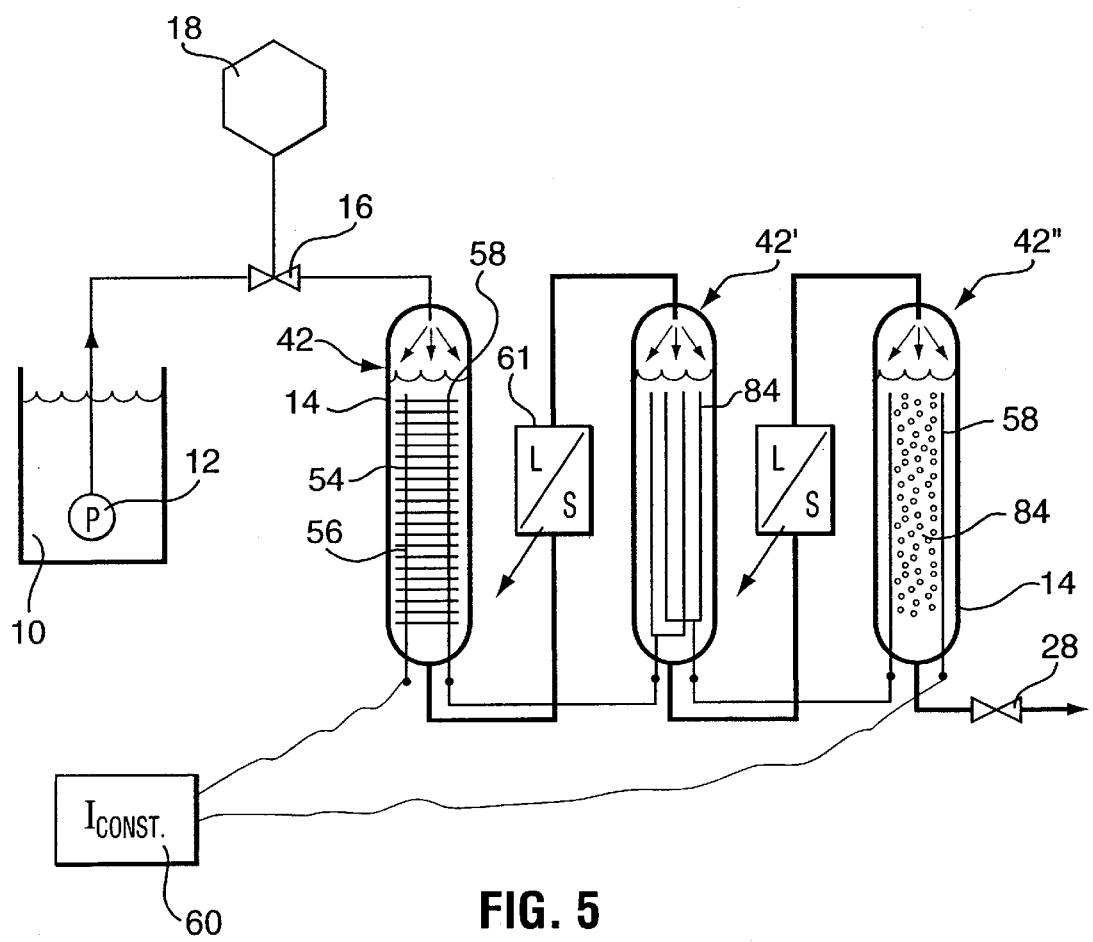
FIG. 5 is a schematic illustration of a fifth embodiment of the present invention.

Referring now to FIG. 5, shown is a further variation of the apparatus. In this embodiment, a group of cells 42, 42' and 42" are shown having different arrangements of electrodes. The electrodes within the cell 42 are represented by numeral 54 and are connected to rods 56 and 58, which rods 56 and 58 are, in turn, connected to a constant current supply 60 including control circuiting therein. Greater detail with respect to the cell 42 specifics will be discussed hereinafter. In this configuration, the outlet 22 of cell 42 becomes the inlet 20 of cell 42' and so on with respect to cell 42". Oxidant 18 may be added as necessary and further, a liquid/solid separation device 61may easily be incorporated in the circuit to isolate floc and aqueous phases before passage into a subsequent cell.

Regarding the differing electrode geometry, cell 42 provides a parallel plate system arranged coaxially in spaced apart vertical relation. Cell 42' provides an elongate electrode arrangement while cell 42" includes a plurality of loose beads.

Although FIG. 5 illustrates three differing electrode geometries, this is only exemplary. The cells 42 may all include the same electrode geometry or any other combination and quantity.

Figure 6A:
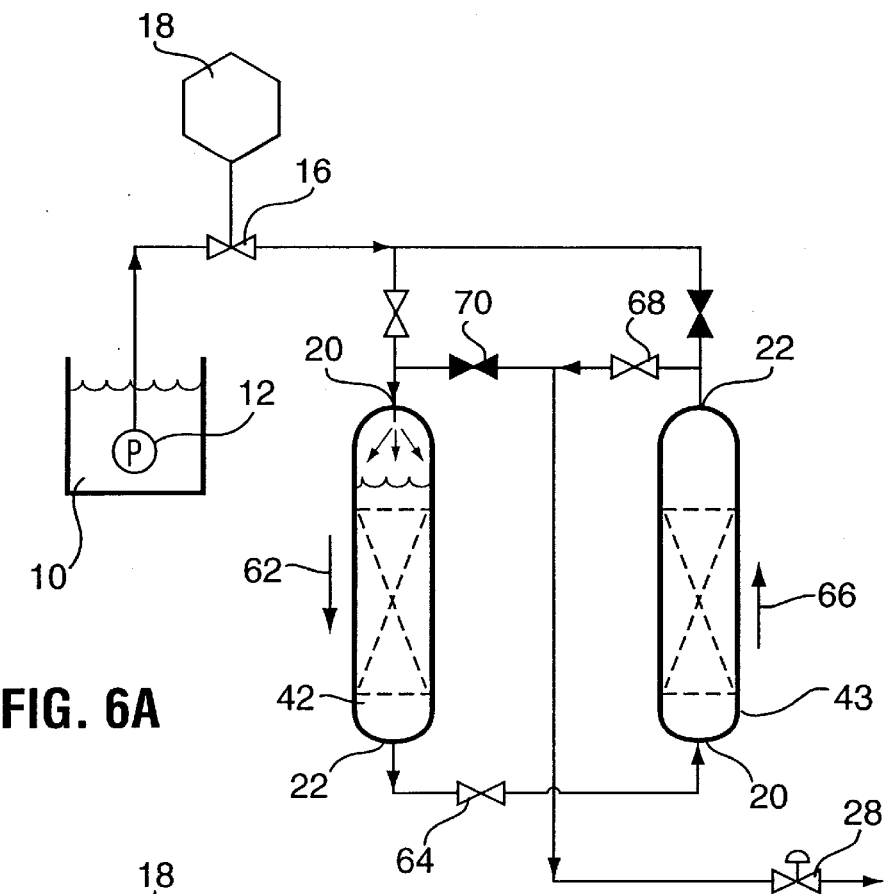
FIGS. 6A and 6B are schematic illustrations of a back flushing circuit for use in the present invention.
Figure 6B:
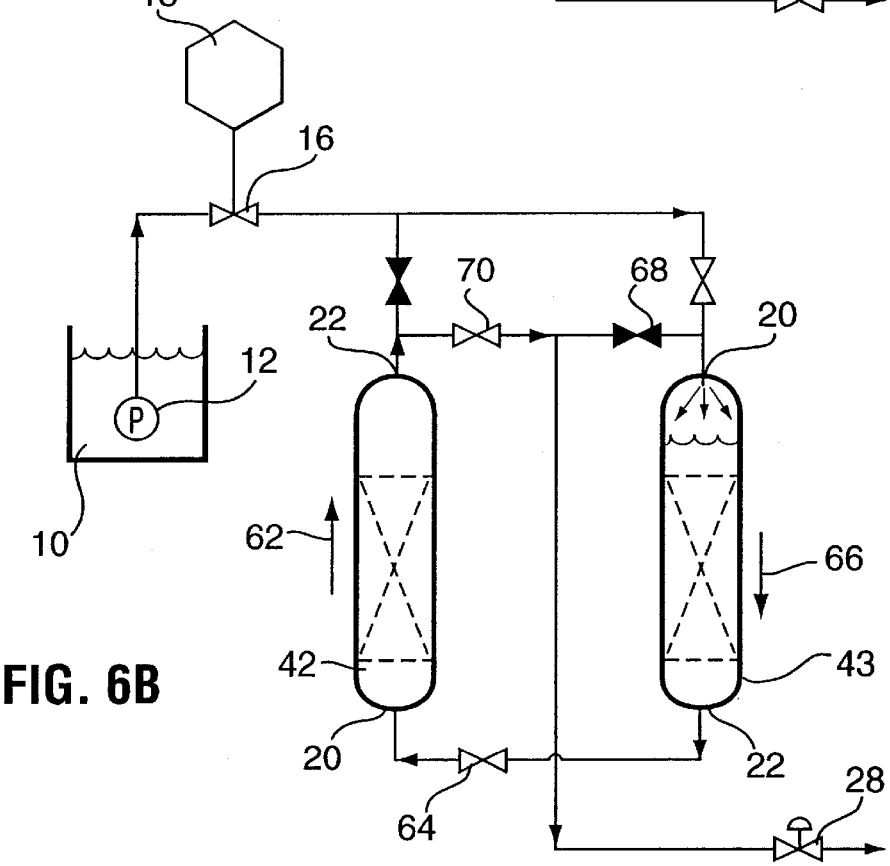

FIGS. 6A and 6B illustrate an arrangement for back flushing cells while online. In FIG. 6A, cell 42 is in use with entrained oxidant and aqueous solution entering at inlet 20 with a flow direction denoted by arrow 62 and exiting at outlet 22 to enter a back flush cell 43 at an inlet 20 thereof. A suitable valve 64 is disposed between outlet 22 and inlet 20. The direction of flow in cell 43 is indicated by arrow 66. The material in cell 43 is transported to outlet 22and eventually to flow constrictor 28. A suitable valve is positioned between outlet 22 and constrictor 28.

FIG. 6B illustrates the inverse of FIG. 6A, where cell 42 functions as the back flush cell and cell 43 as the service cell. The flow in the cells is also reversed as indicated. In operation, treated material from cell 43 is transported into the inlet 20 of cell 42. Valve 64 can be used to restrict or eliminate flow. Treated material exits outlet 22 and constrictor 28. A valve 70 is provided between constrictor 28 and outlet 22.

The cells 42 and 43 can be alternatively operated to facilitate back flushing and thus alternate between the flow of FIGS. 6A and 6B. As such, reference to outlets and inlets of the cells have to be interchanged in the description; this is not due to a structural difference, but rather an operational difference.

Cycling between FIGS. 6A and 6B will vary in time depending upon requirements; a short cycle, may be from 30 seconds to approximately 10 minutes, a larger cycle may be from one hour to eight or more hours. Any number of cells may be in a service mode or a back flushing mode at any time.

Figure 7A:
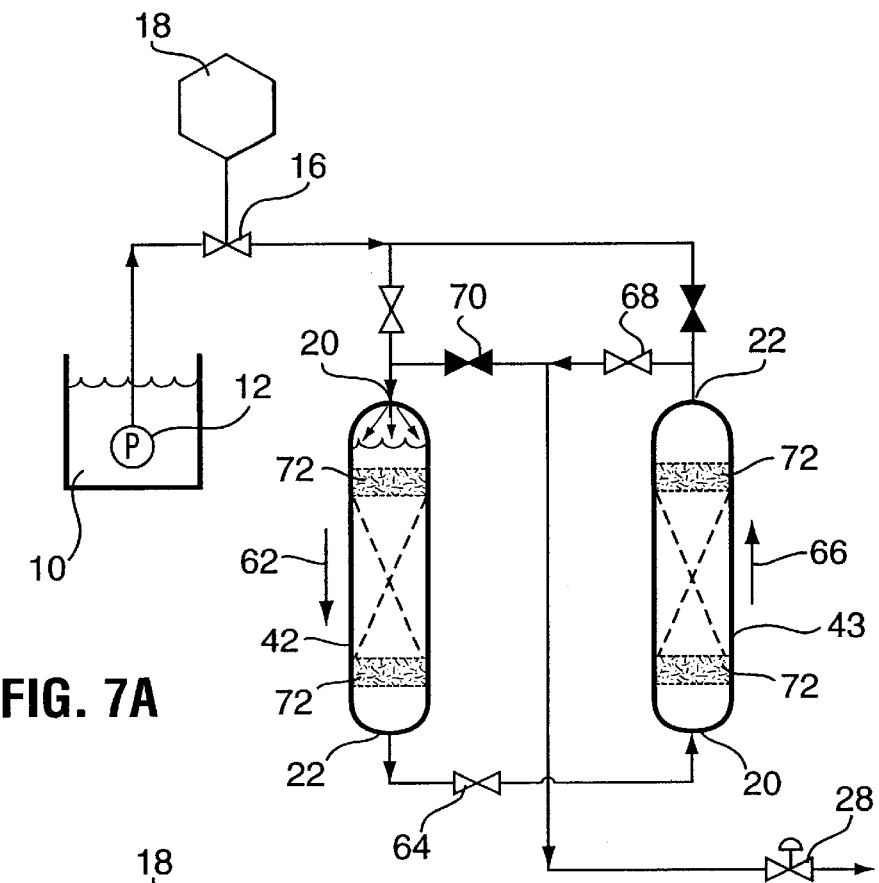
FIGS. 7A and 7B are schematic illustrations of an alternate of FIGS. 6A and 6B.
Figure 7B:
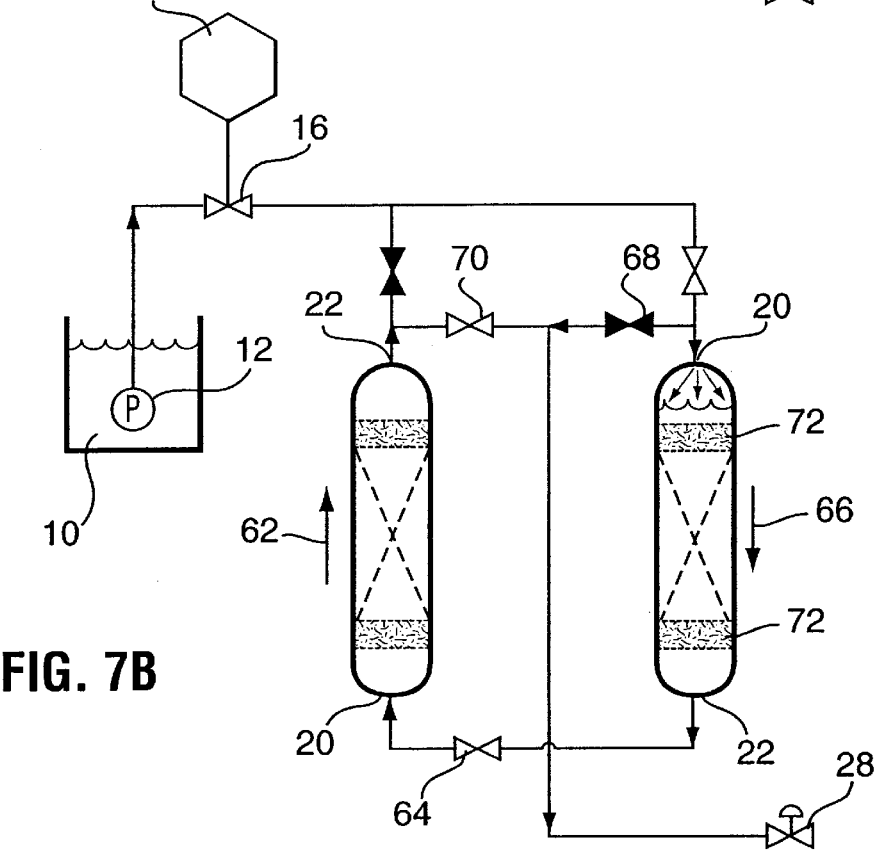

Referring now to FIGS. 7A and 7B, a similar arrangement to that shown in FIGS. 6A and 6B is shown with provisions for capturing debris in the aqueous solution. As illustrated, debris traps, referenced by numeral 72, are provided generally adjacent each inlet and outlet of a respective cell. The traps may comprise any suitable material which is capable of capturing and retaining debris such as fine mesh filters, pads, ceramic balls or other porous media., but will allow passage of fluid. This feature has the benefit of maintaining cleanliness in each cell and, therefore, optimum performance.

Figure 8A:
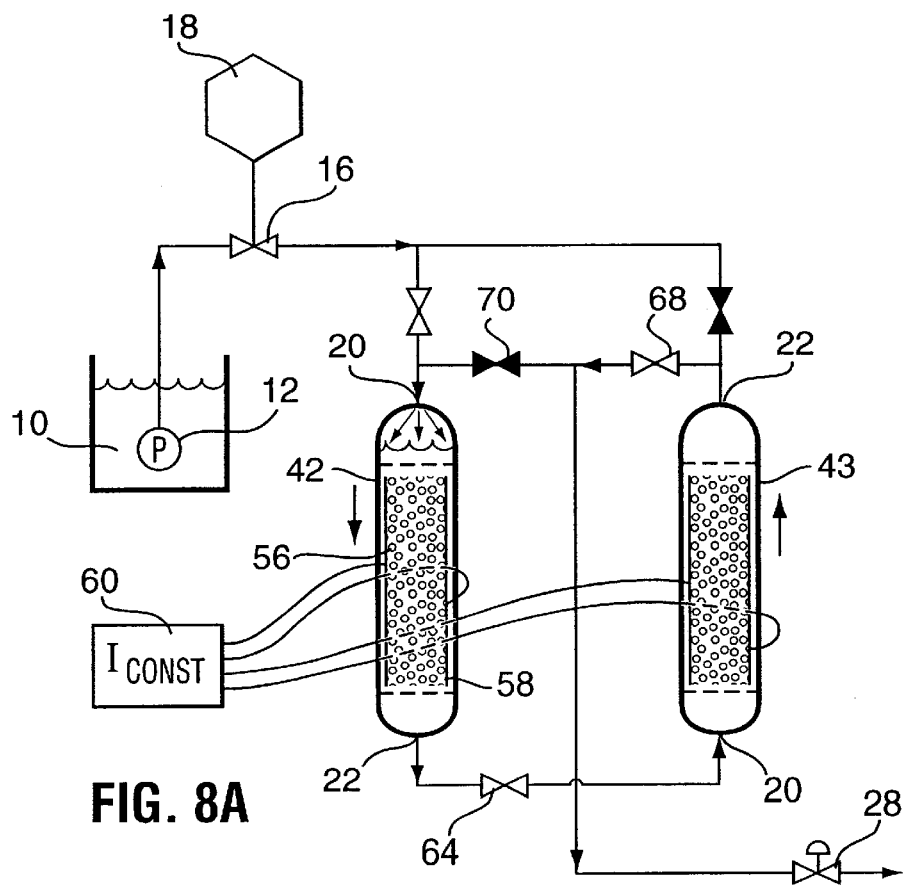
FIGS. 8A and 8B are schematic illustrations of alternatives to FIGS. 6A and 6B and FIGS. 7A and 7B.
Figure 8B:
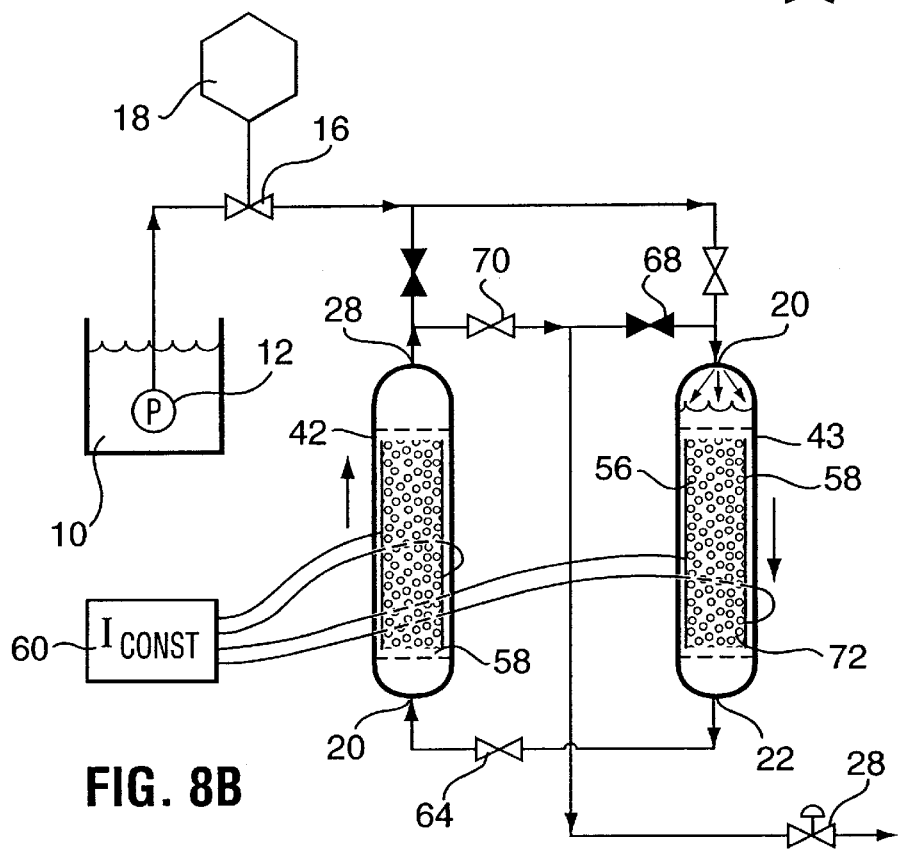

FIGS. 8A and 8B illustrate an embodiment where the back flushing circuit can be used to fluidize the loose beads, referenced by numeral 72. The beads 72 are composed of an electroconductive material (discussed in further detail hereinafter) and are partially consumed in the cell 42/43. Concomitant with mass reduction is stratification; the reverse flow cycling inherent in the arrangement illustrated refluidizes the strata and further provides the benefit of self-cleaning of the beads.

Figure 9:
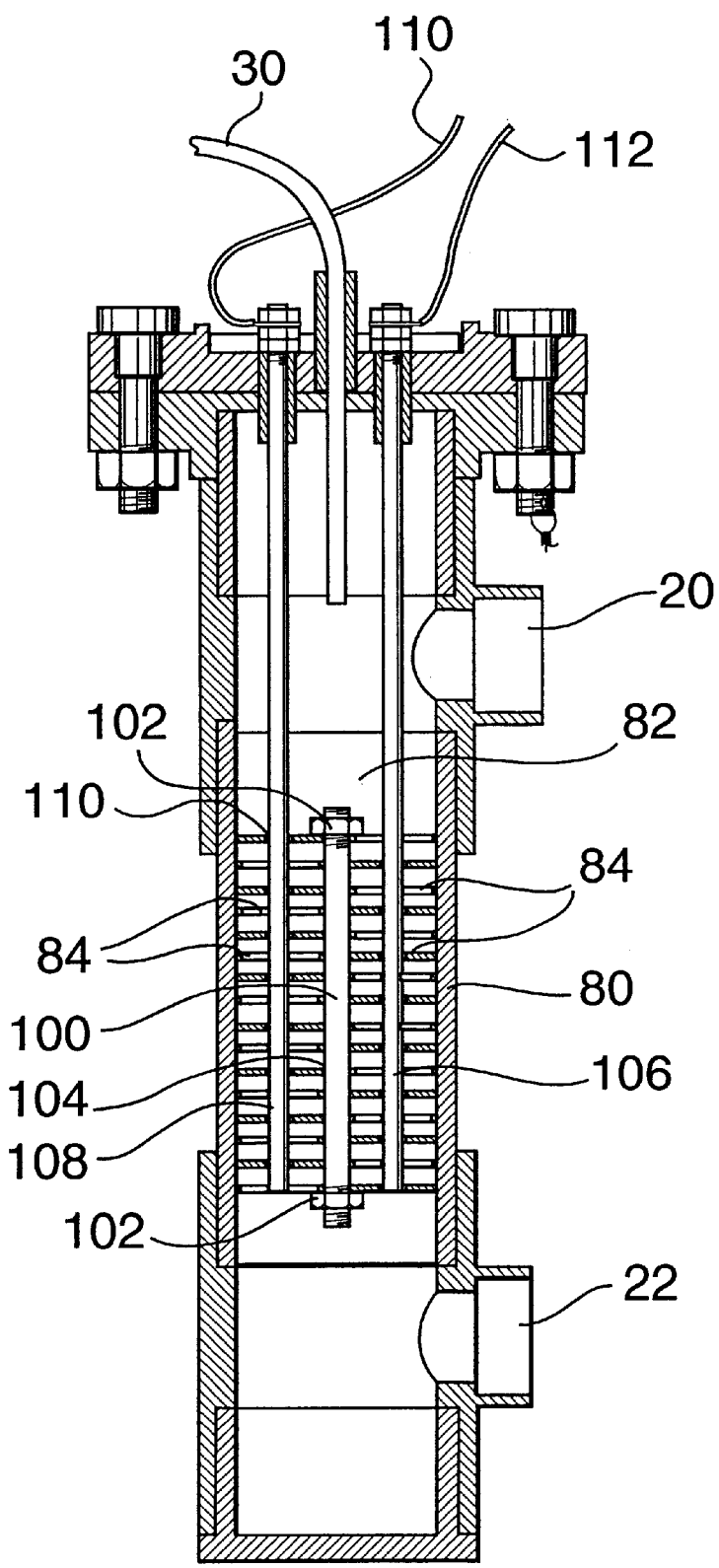
FIG. 9 is a longitudinal cross-section of one embodiment of a cell in accordance with the present invention.
Figure 10:
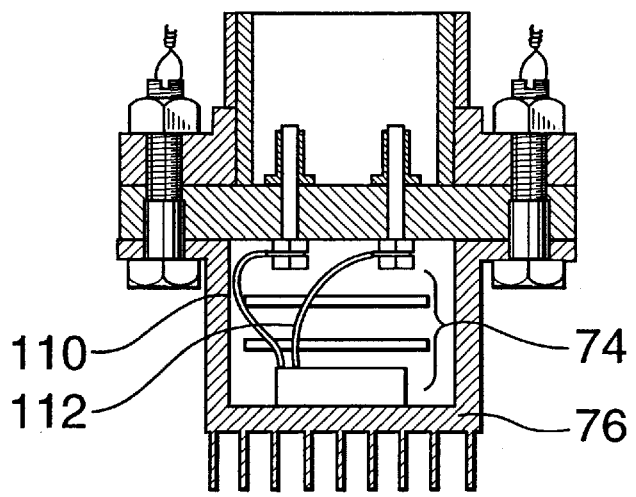
FIG. 10 is a partially cut away view of an alternate of FIG. 9.

FIGS. 9 and 10 illustrate two alternative internal configurations of the cell 42. FIG. 9 illustrates one embodiment in which the electronic circuitry 74 (not shown in FIG. 9 configuration) for exciting the cell 42 is not enclosed within the cell 42; FIG. 10 shows the bottom portion of a configuration of the cell 42 in which a lower cavity 76 is provided in which the electronic cell-excitation circuitry 74 is encapsulated inside a treat sink 76 The embodiments shown in FIGS. 9 and 10 include a gas vent tube 30' for venting excess gas to regulate the waste water level inside the cell 42. Optionally, the waste water level inside the cell 42 may be regulated by a float valve sensor system 30, shown in FIG. 2.

As illustrated in FIG. 9, the electro-flocculation cell 42 is comprises a generally cylindrical elongated multi-part casing 80 of generally circular radial cross-section, which may be composed of suitable non-conductive material such as PVC pipe or plastics extrusion material or fibre glass.

The casing 80 has a cavity 82 in which is mounted a set of spaced parallel plates 84, sixteen such plates 84 being illustrated by way of example. The cavity 82 is sealed except for an inlet 20 into which the waste water from the venturi 16 flows, an outlet 22 out of which waste water flows to the orifice plate 28, and the gas vent tube 30 previously mentioned.

Figure 11:
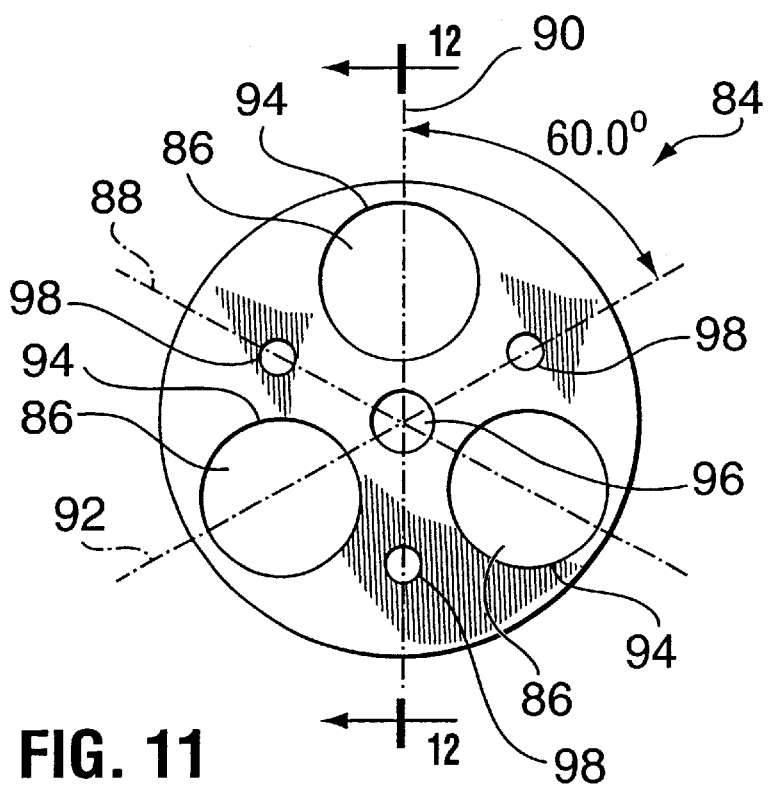
FIG. 11 is a top plan view of a plate for use in the present invention.
Figure 12:
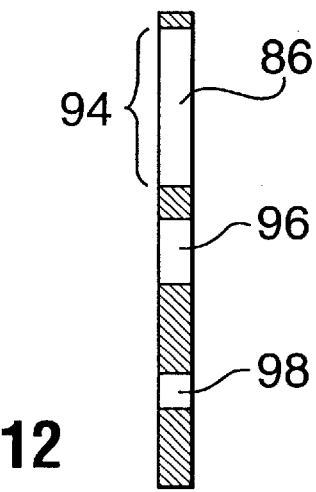
FIG. 12 is a sectional view along line 12—12 of FIG. 11.

The plates 84 may be made of suitable metal, such as aluminum. A representative one of the plates 84 is illustrated in FIGS. 11 and 12. Plate 84 has three off-centre flow openings 86, each of whose centres are located on a discrete one of three equal angularly spaced radial lines 88, 90, 92. The flow openings 86 have sharp edges 94. Plate 84 also has a central opening 96 and three rod openings 98 each centred on a discrete radial line bisecting the radial lines 88, 90, 92, preferably so that the centres of the rod openings 98 are spaced from the centre of plate 84 by about the same radial distance as the centres of the flow openings 86. The plate 84 has circular symmetry; the rod openings 98 alternate in a circumferential sense with the flow openings 86.

As illustrated in FIG. 9, the plates 84 are mounted upon a rod 100 of chemically inert and strong material such as nylon is threaded at each end to receive mating nuts 102. A set of 15 identical annular spacers 104 mounted alternately with the plates 84 about rod 100 maintain a suitable spacing between successive plates 84. The assemblage of plates 84, spacers 104, and rod 100 is held together by tightening the nuts 102 against the outermost of the plates 84. As mentioned earlier, it is desirable that the waste water take a tortuous path through the cell 42 to improve flocculation. It is also desirable to create a strong electric field in the vicinity of the openings 86 and 98 through which the waste water is forced to pass. To create a tortuous path for the waste water flow, the plates 84 alternate in phase relationship along the rod 100 so that the centres of the flow openings 86 of any selected plate 84 are aligned with the centres of the rod openings 98 of adjacent plates 84 on either side (in a longitudinal sense) of the selected plate 84 in the assembly, thereby forcing the bulk of the waste water flow-to generally follow a tortuous path in order to pass through the larger flow openings 86. Further, the sharp edges 94 of the openings 86 facilitate turbulence in the waste water flow and locally concentrate the electric field.

To connect the plates 84 to the cell excitation circuitry 74 and to hold the plates 84 in the desired alignment described above, two metal rods 106, 108 are inserted through radially opposed rod and flow openings 86, 98 in each plate 84 and welded to the edges of the rod openings 98 at weld locations 110. The rods 106, 108 therefore run parallel to the rod 100 in a plane passing through the centres of the plates 84. Each rod 106, 108 alternately passes freely through the centre of a flow opening 86 in one plate 84 and passes through and is welded to rod opening 98 in the next plate 84. The resulting structure divides the plates alternately into two sets, each set welded to and therefore electrically connected to a discrete one of the rods 106, 108. The rods 106, 108 are in turn connected to the cell excitation circuitry 74 by leads 1 10, 112 and are provided with electric current in the manner described below.

Electric current is distributed to the plates 84 by the two rods 106, 108. The plates 84 of the may be made from aluminum plate, but may also be manufactured from iron and other materials that will permit metallic dissolution into a solution. It is advantageous for some waste water compositions to use two or more cells 42 in series, each cell 42 having a different plate material so as to generate different electrochemical effects. The plate materials are best chosen empirically to suit the target pollutant. For example, copper, carbon, or titanium may be useful for some pollutants.

It has been found that a configuration of the plates 84 in which waste water is forced collide turbulently with the plates 84 (which constitute partial obstructions to flow) together with the controllable dissolved oxidant concept discussed with respect to FIGS. 1 through 3 results in an enhancement of the electro-coagulation effect as compared to the simple previously proposed rectangular plates immersed in a flow chamber or concentric pipes arranged in a flow through cell configuration design in both of which previous designs the waste water flows parallel to the plates.

Generally, the cell excitation electronic circuitry 74 rectifies and controls line current received from an external source (not shown) that is pulse width modulated and applied via leads 110, 112 to the plates 84 thereby to periodically energize the plates 84 such that alternate plates differ in potential by a voltage sufficient to establish a relatively strong electric field in the vicinity of the plates 84. By varying the pulse width of the current pulses applied to the plates 84, the integrated current (and therefore the power consumed by the cell 42) can be regulated. A pulse frequency in the range from about 1 Hz to about 1000 Hz and an integrated current density in the range from about 0.1 $Ain^{-2}$ to 10 $Ain^{-2}$ is generally adequate for most conditions. As the current flow depends upon the conductivity of the waste water and the conductivity can vary during operation of the apparatus, the cell excitation electronic circuitry 74 uses measurements of the conductivity between the plates 84 taken between the pulses to determine the optimum pulse width for the next pulse. The cell excitation circuitry 74 also reverses the polarity of the pulses periodically to prevent build-up of agglomerates on the plates.

Figure 13:
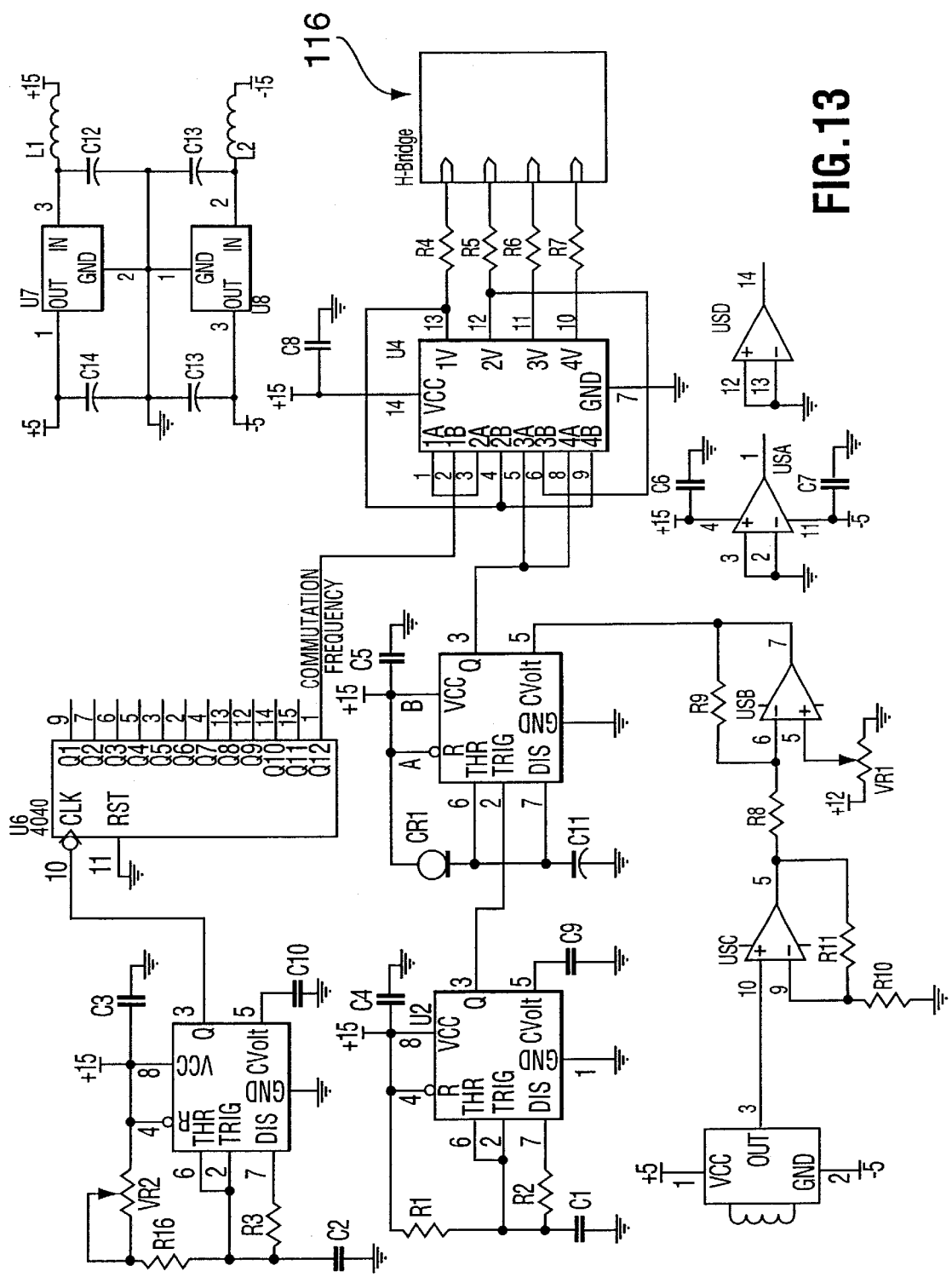
FIG. 13 is a schematic illustration of the circuit for use in the present invention.
Figure 14:
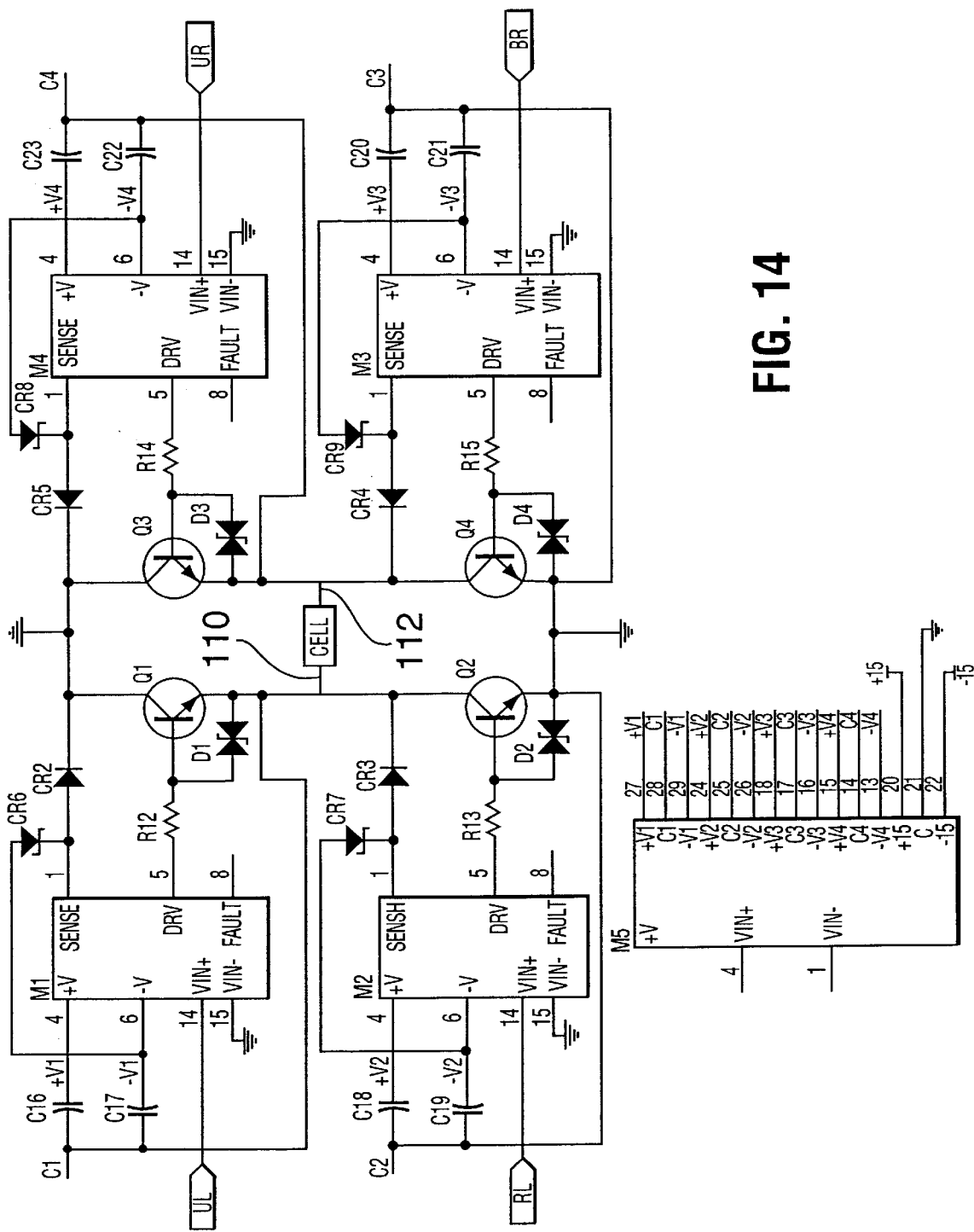
FIG. 14 is a schematic illustration of a switching circuit for use in the present invention.

The cell excitation electronic circuitry 74 may be expected to include a cell excitation signal generator, power switching devices, analogue-to-digital converter, timer, signal multiplexer, and other circuit elements to optimize the cell operation. Such electronics may be implemented in discrete devices such as diodes and transistors, but are preferably digital logic devices capable of manipulating the electronic equivalent of mathematical expressions, as illustrated in FIGS. 13 and 14. The cell excitation circuitry 74 may instead make use of a microprocessor 114 so as to be programmable with external computing devices such as lap-top computers or other serial data transfer systems as illustrated generally in FIGS. 15 and 16.

FIGS. 13, 15, 16 and 14 provide detailed schematic circuit diagrams (in the case of FIGS. 13 and 14) or functional block diagrams (in the case of FIGS. 15 and 16) of suitable embodiments of the cell excitation circuitry 74.

Figure 15:
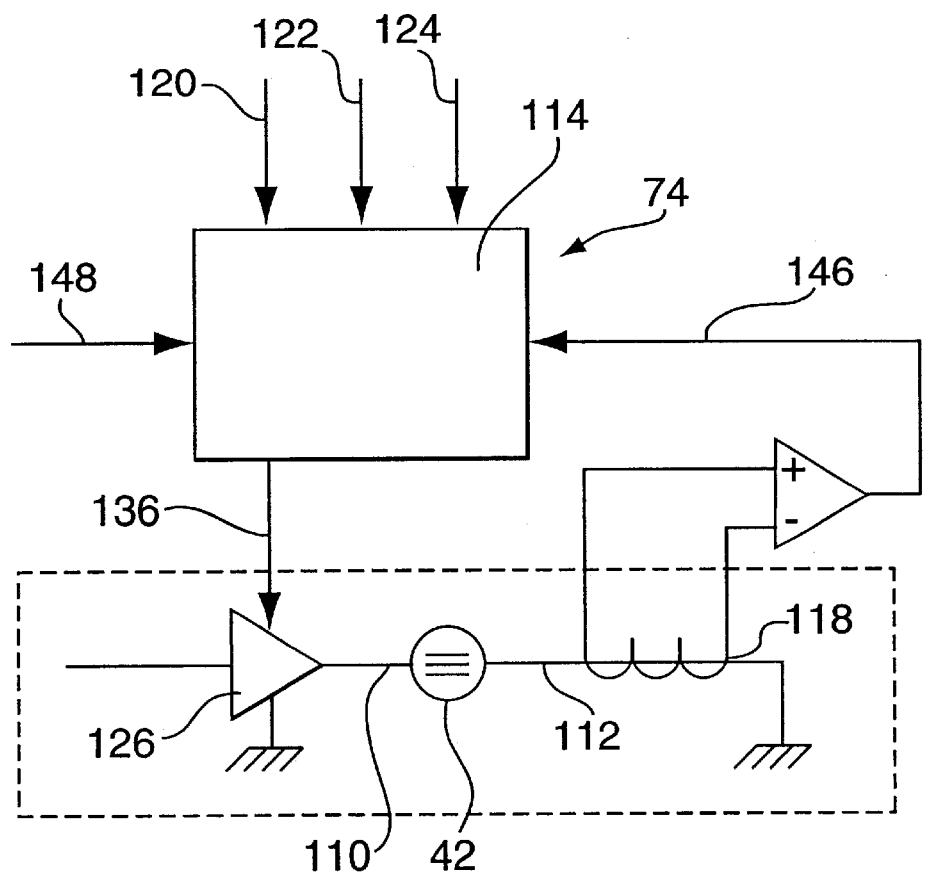
FIG. 15 is a schematic illustration of a microprocessor circuit for use in the present invention.
Figure 16:
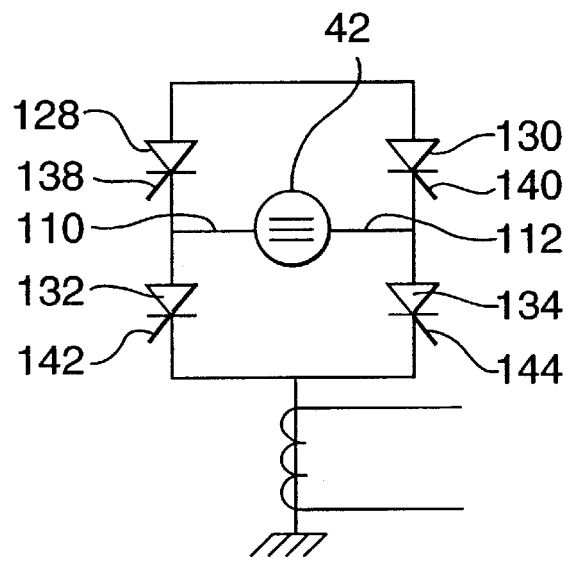
FIG. 16 is a further schematic illustration of the switching circuit for use in the present invention.

The preferred embodiment of the circuitry 74 includes a single-polarity power supply comprising a bridge rectifier (not shown) that provides a rectified DC output to the cell 42. A polarity reversing circuit is provided for periodically reversing the polarity of the current flowing through the cell 42. Polarity reversal may be accomplished by locating the cell 42 within the "H" pattern of current switching devices shown in FIG. 14 (indicated generally in FIG. 13 by reference numeral 116) or as shown in FIG. 16 when a microprocessor based control system such as that shown in FIG. 15 is used. Such devices can be semiconductor switching components such as silicon controlled rectifiers, insulated gate bi-polar transistors or other devices capable of switching large currents, an example of which would be over a wide range of frequencies. The frequency of polarity reversal is best determined empirically and will be expected to depend upon the nature and quantity of the pollutants to be removed from the waste water.

In addition to being periodically reversed in polarity, the current supplied to the cell 42 is pulse-width modulated by that portion of the electronic circuitry 74 shown in FIG. 13 or 15. The pulse width is determined from the conductivity of the waste water and selection of pulse width in turn determines the time-averaged current flow through the cell 42. The pulse width may range from a few nanoseconds to several seconds, permitting treatment of waste water having a wide range of conductivity to be treated by a single cell configuration and fixed power supply. In an exemplary embodiment to be described below, the range of treatable waste water is from near fresh water conductivity of 50 micro-mhos typical of lake drinking water to concentrated seawater having a conductivity in excess of 100 mmhos. Since the circuitry 74 continuously measures conductivity, the apparatus can treat waste water than varies rapidly in conductivity, e.g., fish processing plant waste water flow which alternates in conductivity from fresh water to salt water conductivity. The circuitry 74 measures in situ the real time conductivity of the waste water flowing through the cell. Such measurement is used to limit the current-supplied to the cell to that level sufficient for the electro-coagulation phenomena to be maximized. Such conductivity-data can be obtained by an external conductivity sensor (not shown) interfaced to the electronic circuitry 74, or using time division multiplexing the internal electrodes (rods 106, 108) of the cell 42 can be time-shared for conductivity measurements with the excitation current to provide similar data. Cell current is measured by a current transformer current measuring device, indicated by reference numeral 118 in FIG. 15, to generate an input to the microprocessor 114 so as to regulate the energy consumption of the cell; this same current value data can also be used to calculate the conductivity of the waste water.

FIGS. 15 and 16 illustrate generally the use of a microprocessor 114 to implement PWM control. Reference numerals 120, 122, 124 in FIG. 15 respectively indicate data lines from temperature, conductivity, and turbidity sensors to the microprocessor 114. FIG. 16 shows a discrete component embodiment of the portion of FIG. 15 outlined in dashed lines, Block 126 in FIG. 15 indicates a function that is carried out by four discrete devices 128, 130, 132, 134 shown in FIG. 16. Similarly, the data flow indicated by reference numeral 136 in FIG. 15 represents four signal lines 138, 140, 142, 144 as shown in FIG. 16. Reference numeral 146 indicates a data line providing current flow data to the microprocessor 114 from the current transformer current measuring device 118 via the operational amplifier 146. Reference numeral 148 indicates a communication data flow from an external computing device such as lap-top computers or other serial data transfer systems for programming the microprocessor 114.

As discussed previously, the venturi 16 and the orifice plate 28 are selected so that the cell 42 is operated under pressure to provide dissolution of gases within the cell 42. Gases generated in the cell 42 by electrolysis during the electro-coagulation process will remain in solution until a pressure discontinuity occurs in the form of pressure reduction. Ozone entrained in the waste water via the venturi 16 will be dissolved within the waste water within the cell 42 as long as that waste water is maintained at higher than atmospheric pressure. Ozone is recognized as a strong oxidant and as a coagulant (alternatively hydrogen peroxide, chlorine, bromine, nitro-compounds or other suitable oxidants may be used).

Figure 17:
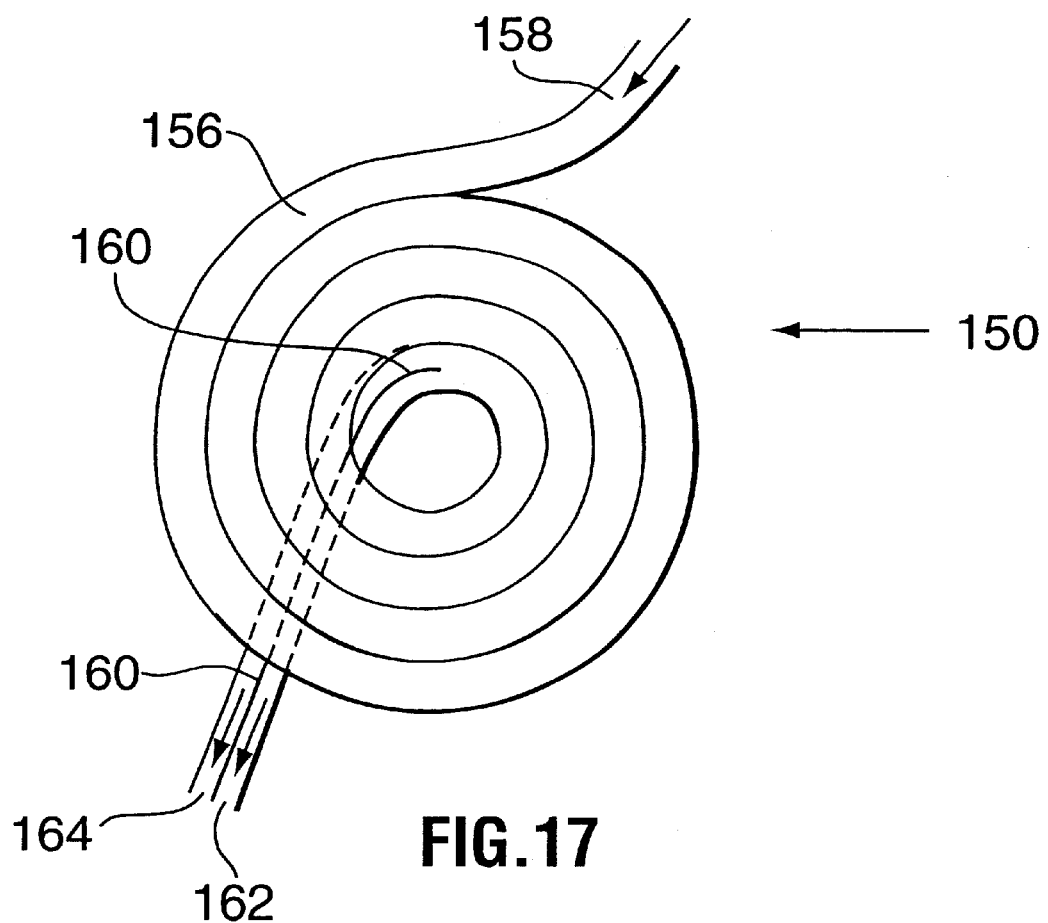
FIG. 17 is a schematic illustration of a further embodiment of the present invention.
Figure 18:
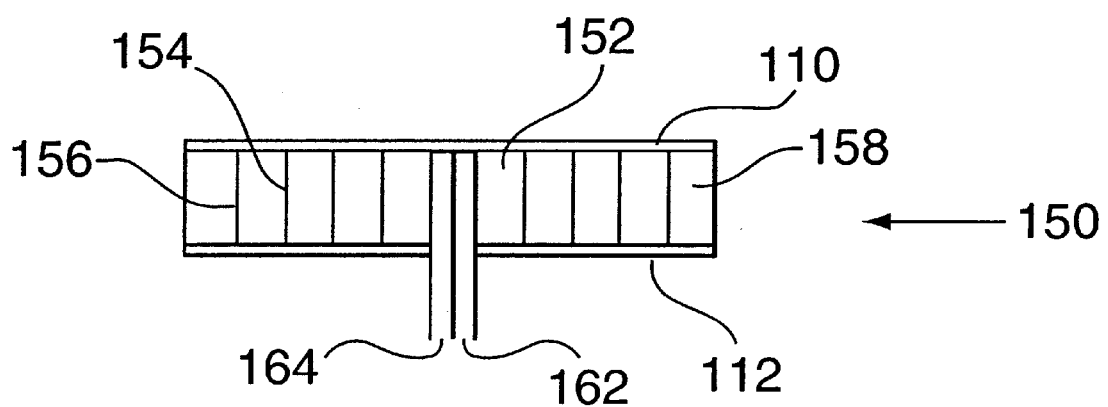
FIG. 18 is a cross-sectional view of FIG. 17.

The mechanical configuration of the cell 42, which embodies the preferred characteristics of providing a concentrated electric field through which the waste water is forced under pressure in a turbulent manner, can be replaced by other configurations. As indicated, for example, in the spiral configuration 150 of FIG. 17, the waste water is subjected to centrifugal acceleration that creates a separation of solids as the fluid is acted upon by concentrated electric fields applied between upper plate 152 and lower plate 154 (FIG. 18) that confine the water flowing between the vertical walls 156 of the spiral configuration. Two separate effluent flows are created as the water flows to the centre of the spiral configuration 150 from inlet 158 at its outer extremity; one effluent flow for solids slurry, and the other one for treated liquid. The two effluent flows are separated after they reach the centre by baffle 160 so as to separate the flow of treated water from the flow of treated water to the outlet 162 and solids slurry to outlet 164.

Figure 19:
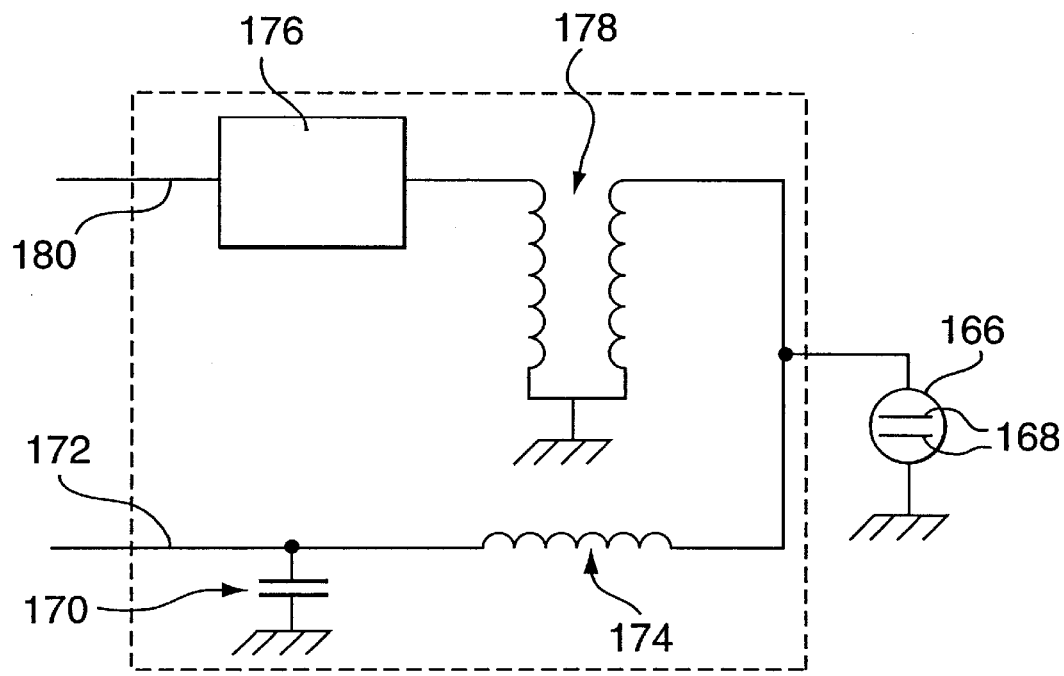
FIG. 19 is a schematic illustration of plasma cell for use in the present invention.

Optionally, an additional contribution to the overall electrochemical reaction within the cell 42 can be provided by a high voltage pulse plasma discharge between the plates 84 that is applied to the cell 42 by the circuit shown outlined in dashed lines in FIG. 19. Pulsed power discharge into water or water-solid slurries is an electro-hydraulic phenomenon characterized by a periodic rapid release of accumulated electrical energy across a submerged electrode gap. The plates 84 of the cell 42 are time shared under the control of the cell excitation circuitry 74. In this manner, normal excitation of the plates 84 stops for a short predetermined interval during which a plasma discharge is triggered between the plates 84. After the plasma discharge is complete, normal excitation resumes. The resulting highly ionized and pressurized plasma transfers energy to the waste water flow via dissociation, excitation, and ionization. The plasma discharge produces high pressure shock waves (>14,000 ATM). Intense cavitation occurs with the associated chemical changes and, further, to separate suspended and dissolved solids from water. The plasma discharge also imparts a cleansing action to the plates and helps to maintain a free electron surface.

FIG. 19 illustrates how a plasma discharge has been successfully produced in a test cell 166 having one pair of plates 168 during a short interruption in the normal excitation of the plates 168. The plasma discharge is produced by a large capacitor bank 170 charged from a suitable power supply input 172 coupled through an inductor 174 to the cell 166. The voltage across the capacitor bank 170 is not sufficient to cause a plasma discharge between the plates 168 of the cell 166. The discharge is initiated by a tickler comprising a pulse generator 176 and step-up transformer 178. The pulse generator 176 is controlled by a signal line 180 under the control of the cell excitation circuitry 74. The pulse generator 176 applies a trigger pulse to the step-up transformer 178 inducing a high voltage pulse which is applied across the plates 168 to produces a spark across the plates 168. The spark creates an ionized path through the cell 166. Once the path is made, the charge stored in the capacitor bank 170 is able to flow along the ionized path. The inductor 174 prevents the spark current from passing through the capacitor bank 170 to ground.

In a typical production cell 42 with multiple plates 84, it is expected that a spark between any adjacent pair of the plates 84 will create a plasma discharge sufficient to cleanse all of the plates 84, and that therefore it will suffice to apply high voltage pulses to all of the pairs of plates 84 through time-sharing of the same connecting lines 110,112 used to supply normal excitation to the plates 84, despite the likelihood that the spark will jump between only one adjacent pair of plates 84 in any particular discharge. Hence the circuit shown outlined in dashed lines in FIG. 19 may be used with a cell 42 having a multiplicity of plates 84. However, time-sharing circuitry (not illustrated) is needed to isolate the shock effect of the spark discharge from the excitation voltage.

Alternatively, a separate spark gap (not shown) in the vicinity of the plates 84 could also be used. Preferably the separate spark gap should be located near the inlet 20, where there tends to be some gas (mostly ozone) that facilitates the formation of the spark.

Figure 20:
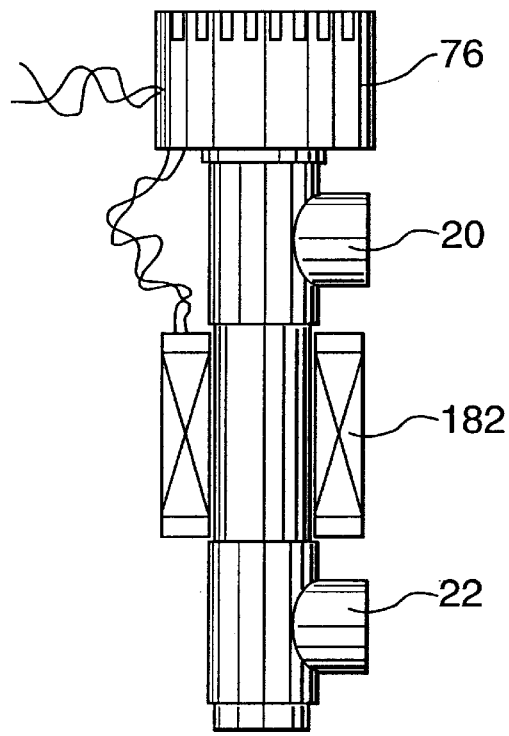
FIG. 20 is a schematic illustration of a further embodiment of the present invention.

Optionally, an additional contribution to the overall electrochemical reaction within the cell 42 can be provided by a magnetic field coil 182 wound about the cell 42 as shown in FIG. 20. The field coil 182 is repetitively pulsed to create a magnetic field. In the exemplary apparatus of the sort discussed below in the Example, a magnetic field strength in excess of in excess of 10,000 Gauss was obtained using 180 volt pulses. An decrease in the time or number of passes through the cell required to remove impurities from waste water of up to 20% has been observed as a result of this modification.

Figure 21:
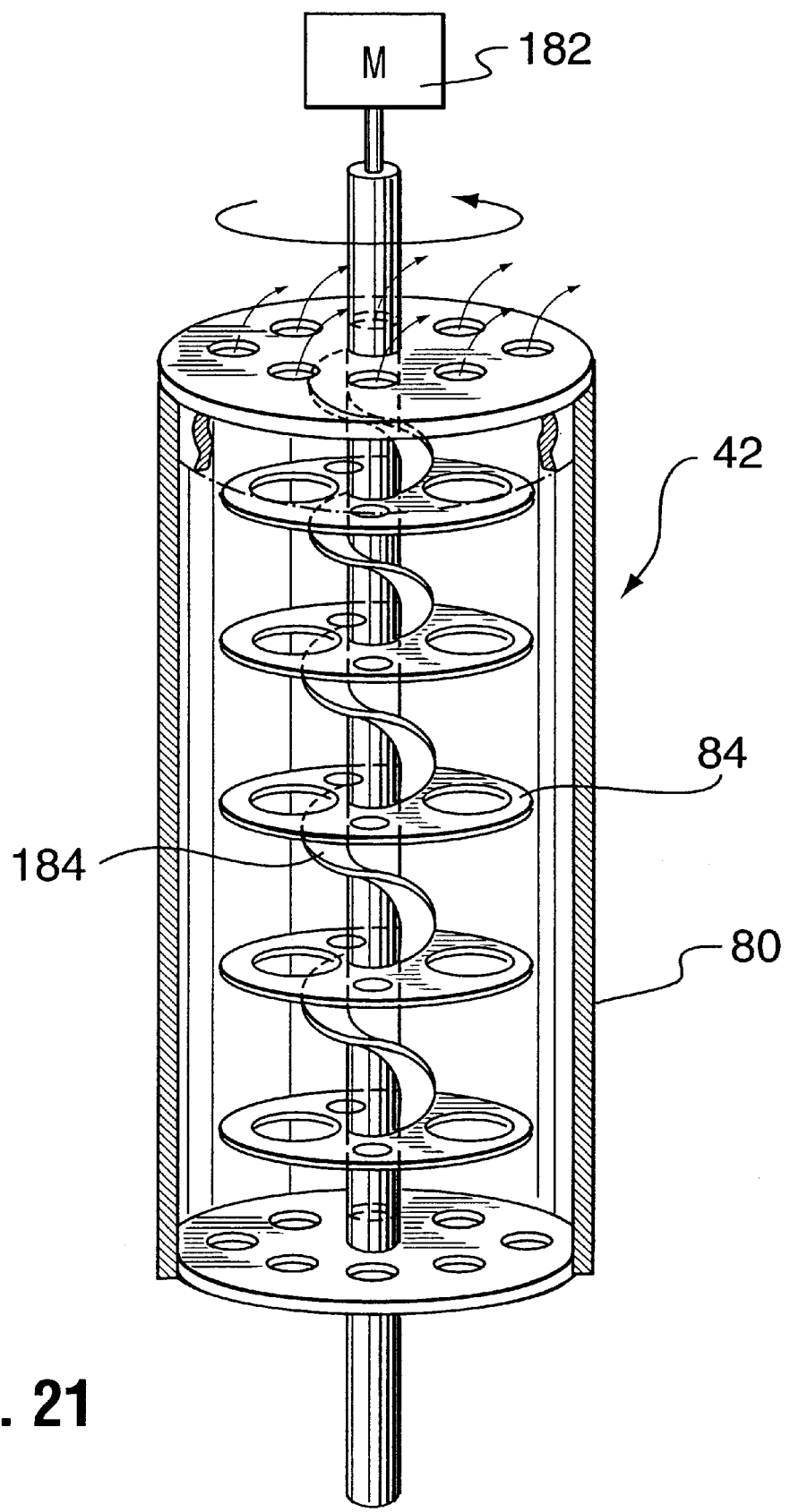
FIG. 21 is a schematic illustration of a still further embodiment of the present invention.
Figure 22:
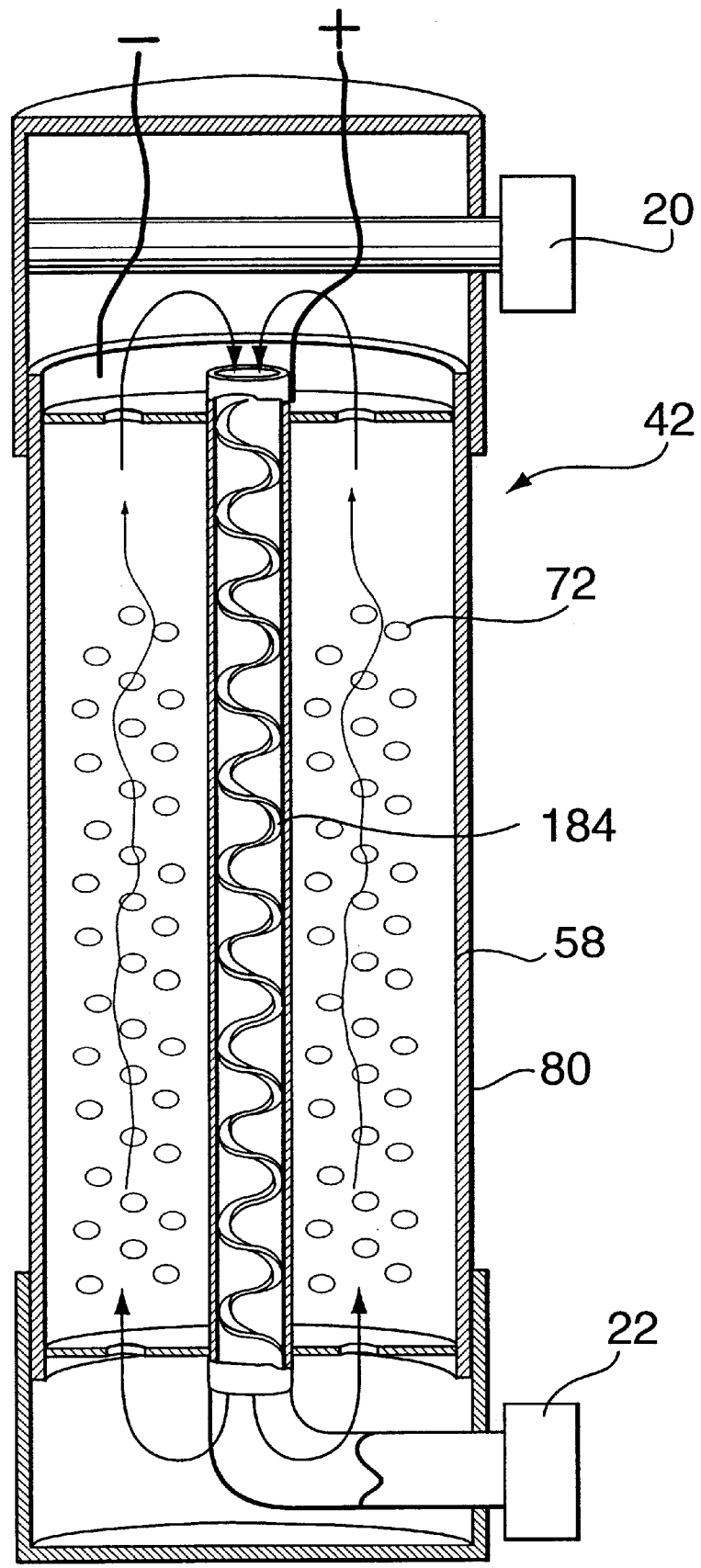
FIG. 22 is a schematic illustration of a still further embodiment of the present invention.

Prior to providing examples of the effectiveness of the arrangements of the invention, reference will be made to FIGS. 21 and 22 illustrating two further alternatives for the cell 42.

In FIG. 21, parts have been removed for clarity and rod 100 (refer to FIG. 9 for background) is rotatably mounted within cell 42 and is rotatable by motor 182. Motor 182 may be activated by circuitry 74 or otherwise a suitable power source (not shown). The individual plates 84 are mounted on rod 100 and may by rotated in-situ within casing 80. The rotation of plates 84 assists in maintaining the cleanliness thereof and thus maintains performance of the overall cell. For further enhancement of the oxidation/floccing process, rod 100 may have an auger profile 184 to transport fluid within the cell 42, and assist in the counter current interaction of dissolved gas and aqueous solution. These concepts have been discussed with respect to FIGS. 1 through 3.

FIG. 22 illustrates a similar view of cell 42, but with the use of beads 72 in place of plates 84. The beads 72, will comprise a material similar to those set forth for plates 84. The beads 72 may range in size from 50 mesh to 1.5" and this will, of course, depend on the specific requirements of the cell 42. Current supplied from supply 60 (not shown) is connected to rods 56 and 58 and which interact with electroconductive beads 72. The provision of the auger rod 184 serves to circulate or refluidize the beads 72 within the cell and as a benefit, the beads are effectively cleansed of debris in the process, thus presenting a fresh reaction surface for the process regularly. This fluidization also promotes a more uniform mass loss of the beads rather than having sections of beads having disproportionate mass relative,to other beads. As an accompanying benefit, this promotes process control.

It has been found with the bead or granule version of the apparatus, that the beads provide a high surface area relative to interspatial aqueous volume resulting in equivalent treatment for low feed quantity conductivities. In essence, a significantly lower amperage is required to operate the cell when the beads are used to achieve the same effect provided with large plate type electrodes.

Having thus described the invention, reference will now be made to the examples.

EXAMPLES

An exemplary tested apparatus constructed in accordance with the invention as described above had the following characteristics.

For use with the exemplary cell 42 illustrated in FIGS. 9 through 12, the pump 12 was chosen to be capable of pumping gray water or polluted effluent at a rate of 6 gallons per minute at a nominal pressure of 60 psi gauge, the venturi 16 was a model 684 Mazzie Injector, the gas valve 52 was a needle valve, and the ozone source 18 was chosen to provide approximately 4 grams of ozone per hour. The pressure of the waste water in the cell 42 was chosen to be approximately half the pump pressure, in this case 30 psi gauge for a pump outlet pressure of 60 psi gauge. Generally, in designing such cells 18, a pressure drop across the venturi 16 of about half the pump pressure is satisfactory. A higher pressure in cell can be used to improve the efficiency of the process, but at a higher cost for a larger pump and power to run the pump.

In the following description, exact dimensions are provided for the particular cell 42 for which test results are provided below, but it should be understood that the cell 42 may be scaled to any size that the designer deems appropriate.

The diameter of the casing 80 is not critical. A 3-inch inside diameter was employed for illustrative purposes in the following discussion.

Plates 84 were composed of 0.125" thick type 6061-T6 aluminum, 2.990" in diameter. Openings 86 were 1.000" in diameter, and the centres located at a distance of 0.875" from the centre of the plate on a discrete one of radial lines 88, 90, 92. Opening 96 had a 0.380" diameter and three 0.265" diameter rod openings 98 each centred at a distance of 0.875" from the centre of the plate, the discrete radial line bisecting the radial lines 88, 90, 92.

The plates 84 were mounted upon a ⅜" diameter 6.500" nylon rod 100 threaded at each end for nylon nuts 102. The plates 84 were equidistantly longitudinally spaced from one another by a set of fifteen 0.500" diameter Teflon" spacers 104 each having a central opening of 0.375" and a thickness of 0.250".

The metal rods 106, 108 were chosen to be ¼" in diameter and 14.250" in length were spaced 1.750" from one another.

The cell excitation circuitry 50 drew power from a three-phase 220 VAC 60 Hz line. The potential between successive plates 84 was chosen relative to the conductivity of the waste water. For high-conductivity waste water, voltages as low as about 30 volts in a cell passing 20 amperes of current would be typical for, say, fish processing plant waste water. This reflects a power dissipation in the cell of about 600 watts, which tends to be a suitable dissipation value for lower conductivity water in 3-inch diameter cells of the size and configuration described above. The plates were energized at a pulse frequency of 600 Hz by pulses of widths varying from 6.5 microseconds to 2 seconds, so as to produce a time-averaged current of 20 to 25 amperes. Larger currents would be possible and desirable (although at higher operating cost) in larger cells, but the current must be limited to prevent overheating in small cells. Polarity reversal of the applied pulses at intervals ranging between 30 seconds and 2 minutes was found to be suitable for the pollutants sought to be removed in the tests.

If plasma discharge is used, for average salt water sewage, a discharge voltage of about 4000 V was found to be satisfactory, discharged at 5-second intervals.

Test results for use of the exemplary waste water treatment apparatus described above are set out below. "BOD" means BOD over a five day period.

Example 1

A spot sample of effluent was taken from a large fish processing plant in Killybegs, Ireland. The plant was processing horse mackerel and herring at the time of sampling. The sample was taken after screening and before discharge to the Council sewerage system.

Approximately 6 litres of effluent sample was treated using the test unit. The raw and treated effluents were sampled and analyzed. The analytical results are outlined in Table 1.

TABLE 1

Treatment Trial on Fish Processing Waste

|  | Raw Effluent After Screening (Sample 1) | Treated Effluent (Sample 2) |
|---|---|---|
| pH | 6.7 | 7.3 |
| $BOD_5$ mg/l | 1160 | 50* |
| BOD mg/l | 2080 | 70 |
| Suspended Solids mg/l | 580 | 23 |

*Calculated from the BOD, COD ratio or Treated Sample 4.

The effluent flocculated well during the treatment process, most of the flocculated material coming to the top of the liquid. The BOD of the effluent was reduced by approximately 95% (a significant reduction) with similar reductions in COD and Suspended Solids levels. The pH of the sample rose slightly to 7.3 but this is of no consequence to the discharge. There were three passes through the cell 42 in this test.

Example 2

A sample of effluent was taken after screening from a second fish processing plant in Killybegs, Ireland. The results of the treatment test are given in Table 2.

TABLE 2

Treatment Trial of Fish Processing Waste

|  | Raw Effluent After Screening (Sample 3) | Treated Effluent (Sample 4) |
| --- | --- | --- |
| pH | 6.6 | 7.7 |
| $BOD_5$ mg/l | 2580 | 104 |
| BOD mg/l | 6400 | 152 |
| Suspended Solids mg/l | 1560 | 30 |

The BOD, COD, and Suspended Solids reductions were all in excess of 95%. The pH of the sample rose to 7.7 after treatment. There were three passes through the cell 42 in this test.

Example 3

A sample was taken from a third fish processing plant in Killybegs, Ireland after screening. The plant was processing mackerel and a large oil input to the effluent could be expected (up to 20%). Plant management said that in their opinion this activity represented one of the worst possible conditions for effluent strength. The results of the sample are given in Table 3.

TABLE 3

Sample of Mackerel Processing Waste

|  | Raw Effluent After Screening (Sample 3) | Treated Effluent (Sample 4) |
| --- | --- | --- |
| pH | 6.4 | 6.85 |
| $BOD_5$ mg/l | 7400 | 24 |
| BOD mg/l | 28800 | 320 |
| Suspended Solids mg/l | 5460 | 78 |

The results indicate a BOD, COD and suspended Solids reduction of greater than 95%. There were six passes through the cell 18 in this test.

The plates 84 in the apparatus according to the invention have been found to erode very slowly relative to the plates in previously disclosed electro-flocculation cells known in the art. It is believed this is due to a combination of countercurrent dissolved gas and the reduced surface area of the plates 84 as relative to prior plates and the sharp edges of the openings 86, 98 in the plates 84 and the sharp edges of the opening in the orifice plate 28. Such sharp edges localizing electric fields and the optional use of plasma discharge are thought to result in cavitation. Cavitation causes solids to break up, but once broken up the resulting fragments appear to recombine and result in clearer water than before the cavitation. However, cavitation by either the sharp edges of the openings 86, 98 in the plates 84 and the opening in the orifice plate 28 or by the optional use of plasma discharge is not essential to the operation of the cell 42. Back pressure on the cell 42 is essential, so the orifice plate 28 may be replaced by any appropriately sized constriction.

In summary, the use of the oxidant in a closed cell or reservoir with the back pressure enhances the availability of small bubbles of oxidant for reaction in the system. This protocol, standing alone, is extremely effective for contaminant separation in an aqueous system. When this protocol is augmented with the electrochemical embodiments discussed, a synergy results providing a highly powerful separation system which has the appeal of being incorporated into further processes as a unit operation.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A continuous method of separating contaminants from an aqueous solution comprising the steps of:

providing an aqueous solution containing contaminants;

providing a closed reservoir having an inlet and an outlet, said inlet at a higher elevation than said outlet;

introducing said aqueous solution into said reservoir;

entraining an oxidant into said aqueous solution;

maintaining super atmospheric pressure in said reservoir to minimize bubble size of said oxidant to thereby maximize available surface area of bubbles of oxidant with said contaminants in said aqueous solution;

oxidizing said contaminants; and selectively inducing a pressure discontinuity extraneous of said reservoir to flocculate oxidized contaminants into a separate phase from said aqueous solution.

2. The method as set forth in claim 1, further including the step of adjusting said super atmospheric pressure relative to said pressure extraneous to said reservoir.

3. The method as set forth in claim 1, wherein entrained oxidant and said aqueous solution flow counter currently in said reservoir.

4. The method as set forth in claim 1, further including the step of providing over pressure relief in said reservoir for relieving undissolved gaseous oxidant.

5. The method as set forth in claim 1, further including the step of controlling residence time of said aqueous solution and oxidant in said reservoir.

6. The method as set forth in claim 1, wherein pressure discontinuity is induced by passing oxidized aqueous solution through an orifice plate.

7. The method as set forth in claim 6, wherein hydroxy/radicals are formed in said solution from passage through said orifice plate.

8. The method as set forth in claim 1, further including the step of isolating a floc phase from said aqueous solution.

9. The method as set forth in claim 1, further including the step of including an electrocell within said reservoir for electrocoagulating said contaminants in said aqueous solution.

10. The method as set forth in claim 9, further including the step of providing a plurality of spaced apart electrodes in said reservoir for contact with said aqueous solution.

11. The method as set forth in claim 9, further including the step of providing granular electroconductive material within said reservoir and applying electric current to said material for electrocoagulation of said electrocell.

12. The method as set forth in claim 9, further including the step of inducing turbulent flow through said electrocell.

13. The method as set forth in claim 1, further including the step of preconditioning said aqueous solution prior to treatment in said reservoir.

14. The method as set forth in claim 13, wherein said step of preconditioning includes removal of suspended solids in said solution.

15. The method as set forth in claim 1, further including the step of providing a plurality of reservoirs arranged such that an outlet of one reservoir of said reservoirs is in valved fluid communication with an inlet of an adjacent reservoir of said reservoirs, said valved fluid communication being adjustable for back flushing connected reservoirs.

16. A continuous method of separating contaminants from an aqueous solution comprising the steps of:

provi ding an aqueous solution containing contaminants;

providing a closed reservoir having an inlet and an outlet, said inlet at a higher elevation than said outlet;

positioning an electrocell with said reservoir for applying an electric field to said aqueous solution;

introducing said aqueous solution into said reservoir;

entraining an oxidant into said aqueous solution;

maintaining super atmospheric pressure in said reservoir to minimize bubble size of said oxidant to thereby maximize available surface area of bubbles of oxidant with said contaminants in said aqueous solution;

oxidizing said contaminants and said oxidant and flocculating said contaminants by exposure to said electric field; and selectively inducing a pressure discontinuity extraneous of said reservoir to flocculate any remaining oxidized contaminants into a separate phase from said aqueous solution.

17. The method as set forth in claim 16, further including the step of preconditioning said aqueous stream to remove insoluble material from said aqueous solution.

18. The method as set forth in claim 16, further including the step of inducing counter current flow between entrained oxidant and said aqueous solution.

19. The method as set forth in claim 16, further including the step of inducing turbulence with said reservoir for enhancing contact between said electrocell, said oxidant and said aqueous solution.

20. The method as set forth in claim 16, further including the step of rotating said electrocell within said reservoir.

21. The method as set forth in claim 16, wherein said electrocell includes a plurality of spaced apart electrodes, each electrode of said electrodes being insulated from an adjacent electrode.

22. The method as set forth in claim 16, wherein said electrocell includes a plurality of movable electrodes for enhancing contact of said electrodes with said oxidant and said aqueous solution.

23. The method as set forth in claim 16, further including the step of providing a plurality of reservoirs arranged such that an outlet of one reservoir of said reservoirs is in valved fluid communication with an inlet of an adjacent reservoir of said reservoirs, said valved fluid communication being adjustable for back flushing connected reservoirs.

24. A method of separating contaminants from an aqueous solution, comprising the steps of:

a. providing an aqueous solution containing contaminants;

b. oxidizing said aqueous solution with an oxidant under adjustable super atmospheric pressure to maintain said oxidant in solution;

c. exposing said aqueous solution to an electrocell for electrocoagulating contaminants; and d. selectively inducing a pressure discontinuity to flocculate coagulated and oxidized contaminants into a separate phase from said aqueous solution.

25. The method as set forth in claim 24, wherein step c. includes providing a plurality of electrocells where treated water from one electrocell of said electrocells is introduced as a feedstream to an adjacent electrocell.

26. The method as set forth in claim 24, wherein electrocell includes at least one of a plurality of spaced apart plate electrodes, discrete granular electrodes or a combination thereof.

27. The method as set forth in claim 24, further including the step of providing a plurality of reservoirs arranged such that an outlet of one reservoir of said reservoirs is in valved fluid communication with an inlet of an adjacent reservoir of said reservoirs, said valved fluid communication being adjustable for back flushing connected reservoirs.

28. An apparatus for separating contaminants from an aqueous solution, comprising:

an aqueous source containing contaminants;

a closed pressurizable reservoir having an inlet and an outlet, said inlet being disposed at a higher elevation than said outlet, said inlet in communication with said aqueous source;

means for introducing an oxidant under pressure into said reservoir;

an electrocell disposed within said reservoir for electrocoagulating material in said aqueous source;

means for supplying current to said electrocell; and means for selectively inducing hydrodynamic cavitation in treated aqueous solution to flocculate oxidized contaminants into a separate phase from said aqueous solution.

29. The apparatus as set forth in claim 28, wherein said reservoir comprises at least one pressurizable container.

30. The apparatus as set forth in claim 28, wherein said reservoir comprises a subterranean earth formation.

31. The apparatus as set forth in claim 28, wherein said electrocell includes a plurality of spaced apart electrodes.

32. The apparatus as set forth in claim 31, wherein said plurality of spaced apart electrodes are arranged coaxially.

33. The apparatus as set forth in claim 31, wherein said electrodes comprise individual plates of electroconductive material.

34. The apparatus as set forth in claim 33, wherein said plates are solid.

35. The apparatus as set forth in claim 34, wherein said plates include apertures in spaced relation.

36. The apparatus as set forth in claim 35, wherein said apertures induce turbulent flow of said aqueous solution.

37. The apparatus as set forth in claim 36, wherein said apertures are profiled for localized concentration of an electric field produced within said apertures.

38. The apparatus as set forth in claim 33, wherein said individual plates include a permeable shell within which is disposed granular or sealed electroconductive material.

39. The apparatus as set forth in claim 33, wherein said plates include means for inducing turbulent flow of said aqueous solution within said reservoir.

40. The apparatus as set forth in claim 31, wherein said electrocell includes discrete beads or granules of electroconductive material within said reservoir and between said spaced apart electrodes.

41. The apparatus as set forth in claim 40, wherein said reservoir includes means for imparting motion to said beads or granules within said cell.

42. The apparatus as set forth in claim 28, wherein said apparatus includes a plurality of reservoirs, each reservoir including an electrocell having said electrodes, wherein said each reservoir includes at least one of a plurality of solid plate electrodes, permeable electrodes containing bead or granular electroconductive material, bead or granular material between said electrodes in said reservoir or a combination thereof.

43. The apparatus as set forth in claim 28, wherein said reservoir includes over pressure relief means for relieving excessive pressure within said reservoir.

44. The apparatus as set forth in claim 28, wherein said apparatus include s liquid sensor means operable with aqueous solution level in said reservoir and said means for introducing said oxidant into said reservoir for releasing oxidant into said reservoir.

45. The apparatus as set forth in claim 28, wherein said means for selectively inducing hydrodynamic cavitation comprising a variable orifice valve for altering outlet pressure at said outlet of said reservoir.

46. The apparatus as set forth in claim 28, wherein said apparatus includes a plurality of pressurizable containers in alternating inverted relation where an outlet of one container of said containers is in fluid communication with an inlet of an adjacent container of said containers.

47. The apparatus as set forth in claim 46, wherein said containers in fluid communication include valve means disposed therebetween for selective operation to permit back flushing of reservoir contents.

* * * * *